US010630722B2

(12) United States Patent
McErlane et al.

(10) Patent No.: US 10,630,722 B2
(45) Date of Patent: *Apr. 21, 2020

(54) SYSTEM AND METHOD FOR SHARING INFORMATION IN A PRIVATE ECOSYSTEM

(71) Applicant: JPMorgan Chase Bank, N.A., New York, NY (US)

(72) Inventors: Gil McErlane, Erskine (GB); Raj Sharma, Edinburgh (GB); Gene Fernandez, Holmdel, NJ (US); Rory Macdonald, Glasgow (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/280,110

(22) Filed: Feb. 20, 2019

(65) Prior Publication Data

US 2019/0182293 A1 Jun. 13, 2019

Related U.S. Application Data

(63) Continuation of application No. 15/214,047, filed on Jul. 19, 2016, now Pat. No. 10,230,762, which is a
(Continued)

(51) Int. Cl.
*H04L 29/06* (2006.01)
*H04L 9/08* (2006.01)
*G06F 21/62* (2013.01)

(52) U.S. Cl.
CPC .......... *H04L 63/168* (2013.01); *H04L 9/0863* (2013.01); *H04L 9/0872* (2013.01);
(Continued)

(58) Field of Classification Search
CPC combination set(s) only.
See application file for complete search history.

(56) References Cited

U.S. PATENT DOCUMENTS

| 6,266,683 B1 | 7/2001 | Yehuda et al. |
| 6,317,838 B1 | 11/2001 | Baize |

(Continued)

FOREIGN PATENT DOCUMENTS

| EP | 0647902 | 12/1995 |
| WO | 2009/060393 | 5/2009 |

OTHER PUBLICATIONS

U.S. Appl. No. 11/468,218, filed Aug. 29, 2006, System and Method for Plug and Configure Framework.
(Continued)

*Primary Examiner* — Malcolm Cribbs
(74) *Attorney, Agent, or Firm* — Greenblum & Bernstein, P.L.C.

(57) ABSTRACT

A system and method are disclosed for controlling a restricted ecosystem of software applications. The method may include originating software applications from a vendor, associating a collection of the software applications with a user, controlling the distribution of the collection of software applications to the user, controlling access to the collection of software applications based on user credentials, and controlling the installing and updating of the collection of software applications. The method may additionally include executing a first software application from the collection of software applications, executing a second software application, and transferring data from the first software application to the second software application. The method may additionally include transferring data from the first software application to a web service.

20 Claims, 14 Drawing Sheets

Related U.S. Application Data continuation of application No. 13/804,028, filed on Mar. 14, 2013, now Pat. No. 9,430,211.

(60) Provisional application No. 61/695,786, filed on Aug. 31, 2012.

(52) U.S. Cl.
CPC ........ *H04L 9/0894* (2013.01); *H04L 63/0428* (2013.01); *H04L 63/083* (2013.01); *G06F 21/62* (2013.01); *H04L 2209/38* (2013.01)

(56) References Cited

U.S. PATENT DOCUMENTS

| | | |
|---|---|---|
| 6,789,256 B1 | 9/2004 | Kechriotis et al. |
| 6,826,696 B1 | 11/2004 | Chawla et al. |
| 7,093,020 B1 | 8/2006 | McCarty et al. |
| 8,935,691 B2 | 1/2015 | Ben Ayed |
| 9,769,654 B2* | 9/2017 | Bettale ................ H04W 12/04 |
| 9,811,868 B1 | 11/2017 | Rapoport et al. |
| 2002/0029269 A1 | 3/2002 | McCarty et al. |
| 2003/0154403 A1 | 8/2003 | Keinsley et al. |
| 2003/0159072 A1 | 8/2003 | Bellinger et al. |
| 2004/0104947 A1 | 6/2004 | Schmitt |
| 2005/0015744 A1 | 1/2005 | Bushey |
| 2006/0085334 A1 | 4/2006 | Murphy |
| 2006/0117178 A1 | 6/2006 | Miyamoto |
| 2006/0219776 A1 | 10/2006 | Finn |
| 2006/0236107 A1 | 10/2006 | Ishibashi |
| 2007/0106984 A1 | 5/2007 | Olsen |
| 2008/0022413 A1 | 1/2008 | Holtzman |
| 2009/0144659 A1 | 6/2009 | Do |
| 2009/0228708 A1 | 9/2009 | Trostle |
| 2010/0077155 A1 | 3/2010 | Cohen |
| 2010/0246823 A1 | 9/2010 | Xiao |
| 2011/0072279 A1* | 3/2011 | Milliken ................ G06F 21/71 713/194 |
| 2011/0202755 A1 | 8/2011 | Orsini |
| 2012/0201380 A1 | 8/2012 | Kohiyama |
| 2012/0215816 A1 | 8/2012 | Kidron |
| 2012/0215878 A1 | 8/2012 | Kidron |
| 2012/0227115 A1 | 9/2012 | Kidron |
| 2012/0265603 A1 | 10/2012 | Corner et al. |
| 2012/0284122 A1 | 11/2012 | Brandis |
| 2013/0138957 A1 | 5/2013 | Dharmarajan |
| 2014/0096230 A1 | 4/2014 | Wade |
| 2014/0122052 A1 | 5/2014 | Liu |
| 2014/0177839 A1 | 6/2014 | Wagner |
| 2014/0281559 A1 | 9/2014 | Trachtenberg |
| 2015/0319144 A1 | 11/2015 | Barton |
| 2017/0104736 A1 | 4/2017 | Seul |
| 2017/0180340 A1 | 6/2017 | Smith |
| 2017/0201503 A1* | 7/2017 | Jayasena ............. G06F 12/1408 |

OTHER PUBLICATIONS

Great Britain Search Report, dated Jan. 8, 2014.
Uk Supplemental Search Report, (dated Aug. 4, 2014).

* cited by examiner

SYSTEM AND METHOD FOR SHARING INFORMATION IN A PRIVATE ECOSYSTEM

CROSS-REFERENCE OF RELATED APPLICATIONS

The present application is a continuation of U.S. patent application Ser. No. 15/214,047, filed on Jul. 19, 2016 which is a continuation of U.S. patent application Ser. No. 13/804,028, filed Mar. 14, 2013, now U.S. Pat. No. 9,430,211, issued Aug. 30, 2016, which claims priority to U.S. Provisional Application No. 61/695,786 filed on Aug. 31, 2012. Each of these earlier applications is incorporated herein by reference in its entirety.

TECHNICAL FIELD

The invention is related generally to the field of communications, and more particularly, to systems and methods for securely sharing data between applications.

BACKGROUND OF THE INVENTION

Today there are a variety of computer devices or user devices available to users for running computer applications, processing information, and sharing content and other data. The computer devices include user devices such as personal computers, lap-tops, notebooks desktops, tablets, PDAs (personal digital assistants), smart phones (e.g., the iPhone, Samsung Galaxy, Amazon Kindle and Kindle Fire, etc.), netbooks, and other forms of computer devices. These devices are portable or mobile in varying degrees. Any of them can be part of a mobile communication system that allows communication between different users using their particular devices.

Typically, these devices receive applications, content, and other data by communicating with a central server controlled by a single vendor associated with the particular user device. For example, user devices such as mobile devices manufactured by Apple, such as the iPod iTouch, iPhone, or iPad, typically receive applications, content, and other data by communicating with Apple's central communication server, e.g., iTunes. Similarly, mobile devices running on Google's Android platform typically receive applications, content, and other data by communicating with Google's central server, Google Play (f.k.a. the Android Marketplace), and mobile devices running on Window's Mobile platform receive applications, content, and other data by communicating with Window's central server, the Windows Marketplace.

Mobile communications systems typically implement these central communication servers because they provide a single point of distribution for users to receive applications, content, and other data compatible with their particular device. While providing a single point of distribution ostensibly simplifies the process of searching for and downloading applications ("apps"), content, or data, these central server systems can make it difficult for third party vendors to distribute a suite of apps and, more generally, to control and direct the distribution and update of their third party vendor apps. Typically, these central communication servers only provide a catalog of applications, content, or data, which are distributed in response to a user's request. Typically, these central communication servers only distribute a single, discrete application, content, or data item; moreover, they require users to search for and locate specific applications, content, or data, one-by-one. Typically, the vendor hosting the central communication server controls how the applications, content, or data are distributed; the third party vendors who originated the application, content, or data, has little or no control over how the application, content, or data is distributed.

For vendors seeking to implement a restricted network for privately distributing proprietary applications, content, or data, these limitations pose several problems. By providing a single point of distribution, central communications servers often do not provide third party vendors a mechanism for restricted network distribution, or otherwise restricted or limited distribution, of applications, content, or data. For example, an organization seeking to distribute an iPhone app to its employees would typically distribute the app through iTunes. However, iTunes does not typically provide a way to target a segment of employees or exclude members of the general public from this app. This makes it difficult for the third party vendors to communicate proprietary or confidential applications, content, or data to users. This also makes it difficult for users themselves to securely communicate proprietary or confidential applications, content, or data to other users within a private network. Accordingly, there is a need for a mobile communications system that provides a restricted network for privately distributing proprietary applications, content, or data to users.

For vendors offering multiple applications, content, or data, these limitations pose several additional problems. Significantly, existing systems using the central communication server approach do not provide for apps to be assembled into a group of related apps that can be downloaded together. By distributing only a single, discrete application, content, or data item, the central communication server burdens the user who must search for and select each component in a group of related apps. Often, these central communication servers contain an overwhelming amount of applications, content, or data, further burdening a user's search process. Moreover, by distributing each component of a group of related apps separately in existing systems, users may have difficulty intuitively identifying which components encompass a given group of apps. Although users may understand that an application, content, or data has originated with a particular third party vendor, users may nevertheless be unable to integrate them into a group as intended by the third party distributor, because the components are distributed separately.

Furthermore, distributing each component in a group of related apps separately complicates the process of updating and maintaining the components encompassed in the group. Whereas third party vendors might prefer to synchronize the updating and maintenance of each component in their group of apps, with a central communications server approach, the user must update or maintain each component individually. Moreover, central server systems are typically under the control of the vendor hosting the server (e.g., Apple or Google). Thus, the amount of control the third party vendors have over their own apps is limited. Normally, the third party vendors do not directly control the distribution of app updates. This often makes it difficult for third party vendors to automatically distribute updates or changes to applications, content, or data.

Central communications servers also complicate the process for third-party vendors and users to communicate applications, content, or data across multiple platforms. For third party vendors to distribute a single application, content, or data item across each platform, the vendor typically distributes the application, content, or data item in every distribution channel. That is, for every device a user owns, the user would typically be required to download an application or file from every central communications server. For example, a vendor seeking to distribute a foreign currency exchange trading software application on iPads, Android Tablets, and Windows Tablets, would typically have the applications distributed separately on iTunes, Google Play, and Windows Marketplace. This burdens users operating multiple devices on different platforms; a user would be required to download the application separately from iTunes, Google Play, and Windows Marketplace. The burden is compounded if the vendor is offering a suite of apps across multiple platforms, as users would be required to download and update multiple applications across multiple platforms.

Another common limitation of existing mobile communication systems is that mobile device operating systems often limit how computer applications share or access content or data with other computer applications. For example, some mobile devices place each software app into a separate "sandbox" at installation time. Designed as a security measure to prevent theft, corruption, or deletion of user data, sandboxes are a set of access controls that limit an app's access to files, resources, or hardware on a mobile device. Sandboxing is a structural system design feature that is common to several operating systems, such as the Google Android™ mobile operating system, the Mozilla Firefox™ OS mobile operating system, the RIM B1ackBerry™ mobile operating system, the Apple iOS™ mobile operating system, Nokia Symbian™ or S40™ (Series 40) mobile operating systems, Microsoft's Windows Phone™, Windows 8™, or Windows RT™ operating system, the Samsung bada™ mobile operating system, the Hewlett Packard webOS™ mobile operating system, the Palm OS™ mobile operating system, the Maemo™ mobile operating system, or the MeeGo™ mobile operating system.

Each app installed on a "sandboxed" mobile device has its own sandbox file directory, which serves as the home for the app and its data. For example, a user may use several discrete mobile applications to manage and analyze his or her stock portfolio. However, because mobile devices fragment memory resources into separate sandboxes, each app may retain a separate, duplicative copy of the user's stock portfolio in its respective sandbox. Accordingly, sandboxed mobile devices limit apps from sharing common data resources. This can be problematic for a party trying to operate a private network employing specialized applications where data-sharing is needed.

Sandboxing further has the disadvantage of inefficiently expending computer resources such as memory, processor power, battery, and bandwidth. For example, redundant copies of portfolio information unnecessarily consume the mobile device's memory. Storing redundant copies of information results in excessive processor power, battery, and bandwidth consumption every time each app updates and synchronizes its local copy of stock portfolio information. Thus, sandboxed mobile devices inefficiently consume computer resources.

As noted above, sandboxed mobile devices typically prevent mobile apps from securely and easily communicating information between apps. Methods exist for passing information parameters between apps through URL schemes. However, these methods generally limit the size and complexity of the information the apps can share; they generally do not enable an app to broadly share information content, files, or documents. Moreover, these methods typically provide little or no security measures to ensure the information is shared in a secure manner.

Another disadvantage to fragmenting mobile apps on a mobile device is the inconvenience users experience when navigating between apps. Even though two apps may be created by the same vendor, users have no convenient way to navigate directly between these apps. Users typically toggle between apps by exiting one app and navigating through home screens on the mobile device to launch another. This can be frustrating to users, and in a business enterprise context, can be inefficient.

Yet another disadvantage to fragmenting mobile apps on a mobile device is the brand inconsistency that results from distributing separate apps. Even though two apps may be created by the same vendor, users may nevertheless perceive the two apps as separate brands because they install, update, and maintain information separately.

SUMMARY OF THE INVENTION

One or more of the disadvantages outlined above can be addressed by implementing a private mobile communications ecosystem. A private ecosystem provides a restricted network for privately distributing proprietary applications, content, or data to users. The person of ordinary skill shall appreciate that a restricted network is not limited to restricted networks such as an intranet or LAN, but could encompass restricted delivery of apps, content, and data items over public networks such as the Internet such that the receipt of and use of such restricted items effectively acts as a private network. Moreover, a private ecosystem allows vendors to integrate applications, content, or data into a related collection originating from the vendor. Additionally, a private ecosystem simplifies the process of updating and maintaining the components encompassed in the suite. Furthermore, an ecosystem enables vendors to provide a single mobile communications system to communicate applications, content, or data to users across multiple platforms.

In such a restricted network, a collection of apps can be integrated into a suite defining a private app ecosystem on the user device. In a private app ecosystem, information can be centralized into a single location on the device. Thus, mobile apps may access user information without unnecessarily storing duplicative data resources. Instead of each mobile app storing information in its sandbox, each mobile app (or at least some of the apps in the suite) may access the information from a single location. In a stock portfolio example, where a user has several discrete mobile applications to manage and analyze his or her stock portfolio, the total consumption of computer resources can be reduced by integrating the apps into an ecosystem; instead of storing separate, duplicative copies of a user's stock portfolio for each app, a user's stock portfolio may be centralized and maintained in a single location.

Storing information in a central location has the advantage of reducing the total amount of computer resources consumed, though this approach can reduce the level of access control users have over their information. For example, the user with the stock portfolio ecosystem described above (or the third party vendor distributor of the suits of apps) may not want every single app to access the stock portfolio information. In a sandbox design, users have control over what information may be accessed insofar as mobile apps are limited to the information stored in their sandbox. By centralizing the information, mobile apps could potentially access any information stored in the centralized location; there is no sandbox confining the app's access to information. Reducing access control over what may be sensitive and private information may be addressed by implementing an authorization mechanism that would require apps to request authorization before accessing the information. For example, each time an app requests access to information, the authorization mechanism may notify the user and request the user's authorization to grant access. If the user approves, the authorization mechanism provides access to the information. Thus, in embodiments of the present invention, access to sensitive and private information is controlled by an authorization mechanism that notifies the user and requests the user's authorization to grant access.

Although this provides control over which applications have access to user information, this approach can become burdensome on the user as the number of applications or frequency with which the apps request information from centralized storage location grows. For example, a large number of apps or the apps that frequently access data from the centralized storage location may overwhelm a user with requests for approval. Other embodiments of the invention mitigate this issue through the user of single sign-on or other security measures to protected sensitive, shared data without overwhelming the user.

Embodiments of the present invention include a system for integrating software applications on a computer and a central server into a private app ecosystem. The system may include a user device comprising a computer processor for executing software applications, an application loader for loading the software applications onto the computer processor for execution, an ecosystem controller for locating/retrieving and loading the software applications onto the application loader, a remote server for communicating information to the ecosystem controller at a user device, and a computer memory for storing the information to be shared between the software applications.

Another embodiment of the invention comprises a system for sharing information between software applications on a user device. The system may include a user device comprising a computer memory storing instructions and a computer processor for executing software applications. The processor may be programmed for providing an application loader and an ecosystem controller. The application loader may load the software applications onto the computer processor for execution. The ecosystem controller may load or otherwise make available the software applications to the application loader. The computer processor may access the stored instructions for performing steps including encrypting information shared between private apps; storing the information at a location in the computer memory; and communicating the location to one of the private apps.

In embodiments of the invention, a method is provided for integrating software applications on a user device and a central server into a private ecosystem. The method may include receiving an instruction to load a software application onto an application loader; loading the software application onto a computer processor for execution; and executing the software application.

In another embodiment of the invention, a method is provided for sharing information between software applications on a mobile device. The method may include encrypting the information; storing the information at a location in computer memory; and communicating the location to a software application.

DETAILED DESCRIPTION OF PREFERRED EMBODIMENTS

Embodiments of the present invention include systems and methods for integrating software applications on a computer and a central server into a private ecosystem. Other embodiments of the invention include systems and methods for securely sharing information between sandboxed software applications in a private ecosystem on a computer, and between local software applications on a computer and Web services on a remote server.

As mobile device users increasingly rely on their mobile apps to maximize the value and use of their mobile devices, both users and mobile app developers have found it increasingly difficult to provide a convenient and intuitive way to seamlessly manage a bundled package of mobile apps. Prior to the invention, efforts to manage suites or bundled packages of apps have been predominantly focused on applying security policies to the apps, and are commonly referred to as app-wrapping technologies. While app-wrapping technology, such as the Mocana MAP' Mobile App Protection exists, app-wrapping technology does not provide an inter-app awareness that provides a convenient and intuitive means to manage a suite or bundled package of apps. App-wrapping also does not resolve the limitations of central server based systems where third party vendors cannot directly distribute and/or control distribution of their private app suites.

Furthermore, as mobile device users continue to find different uses for their mobile devices, it is desirable for mobile app providers to have the ability to distribute certain apps to targeted segments or selected segments of mobile device users. However, companies and organizations typically find it difficult to distribute suites or bundled packages of mobile apps to specific targeted user segments. Typically, companies and organizations must distribute their apps through public app stores, such as iTunes, or Google Play. While public app stores are readily accessible by mobile device users, public app stores do not not provide a way for the companies and organizations to define bundled apps or suites, much less to control which bundled sets of apps users receive. Moreover, because of the public and unrestricted nature of the app stores, companies and organizations find it difficult to distribute some apps to a targeted segment of users, while restricting these apps from other users.

Figure 1:
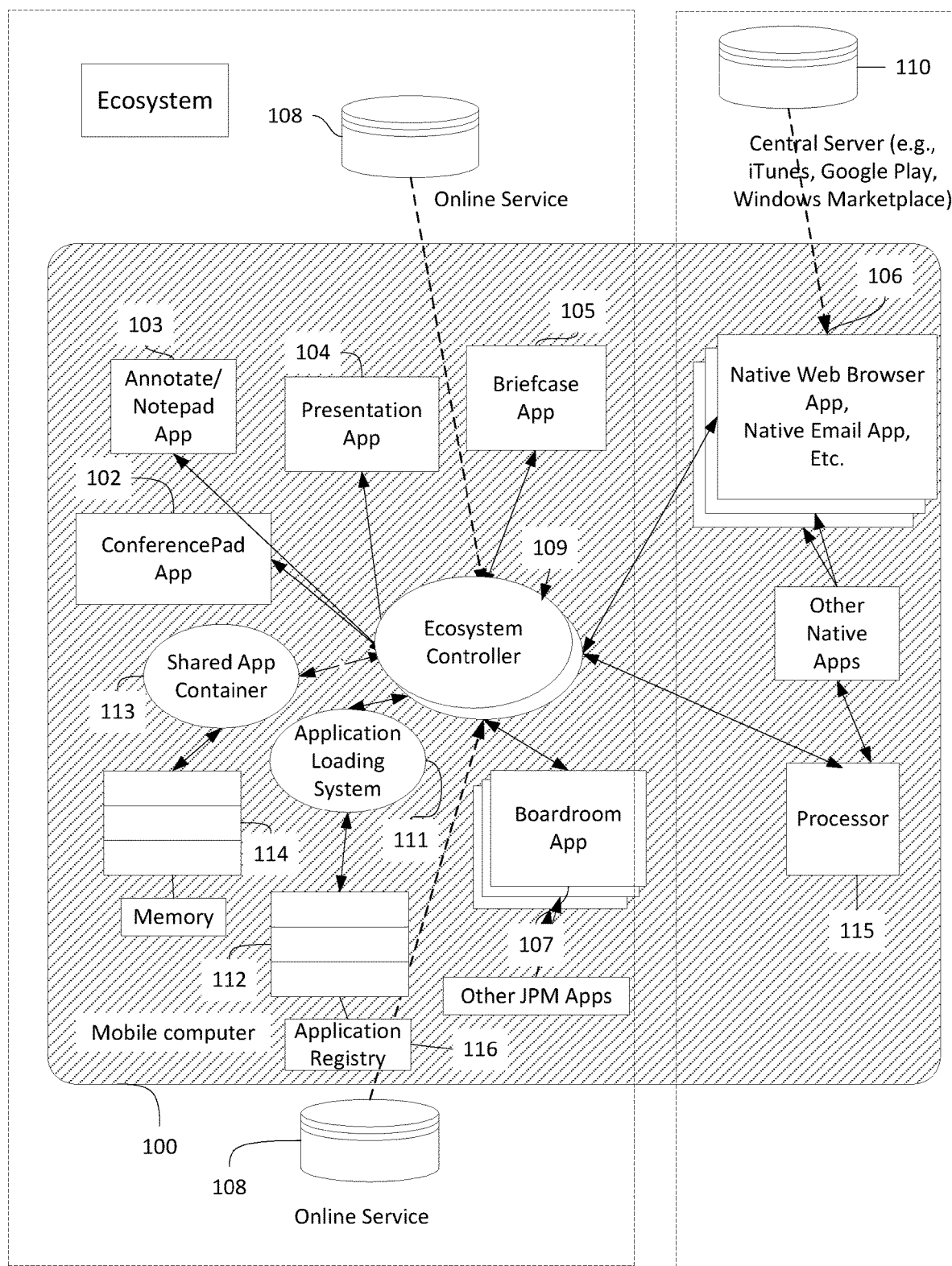
FIG. 1 is a block diagram illustrating a restricted mobile application ecosystem in accordance with an embodiment of the invention.

FIG. 1 is a block diagram illustrating a mobile application ecosystem in accordance with an embodiment of the invention. The system includes a mobile computer 100 (i.e., a mobile user device), a plurality of online service providers 108, a central server 110, a plurality of ecosystem controllers 109, a plurality of mobile applications 102-107, an application loading system 111, a shared app container 113, a memory 114, a mobile computer processor 115, and an application registry 116. Processor 115 executes instructions for operating apps 102-107, ecosystem controller 109, application loading system 111, and shared app container 113. The ecosystem controller 109 controls the transition between apps 102-107 and transfer of data between apps 102-107. The ecosystem controller 109 controls the transition between apps 102¬107 and transfer of data between apps 102-107 by communicating with the application loading system 111, application registry 116, shared app container 113 and memory 114. The ecosystem controller 109 receives apps, content, and data from online services 108. Native apps 106 receive apps, content, and data from a central server 110.

In one embodiment of the invention, there are multiple instances of ecosystem controller 109 on mobile device 100. For example, there may be one ecosystem controller for each app. The online service providers 108, provide applications, content, and data to the ecosystem controller 109. In one embodiment of the invention, the information and data may be provided from a Web service, described in more detail below. This preferably includes app installations and app updates. The ecosystem controller 109, as described in more detail below, processes information between the apps and online service providers. The ecosystem controller 109 also processes information between the apps in the private ecosystem. In another aspect of the invention, the ecosystem controller also processes information between an app within the ecosystem, an app external to the ecosystem, and a Web Service. The application loading system 111, described in more detail below, invokes applications by loading an application onto the computer processor 115. The shared app container, 113, also described in more detail below, stores information to be shared between apps in computer memory.

FIG. 1 illustrates features of the ecosystem controller 109. The ecosystem controller is located at the mobile device, and controls numerous aspects of the private ecosystem. The ecosystem controller controls functions such as how the private ecosystem apps communicate and share information with each other, how the private ecosystem apps communicate and share information with Web services, how the security and authentication of private ecosystem apps and the Web services are managed, how the private ecosystem apps receive updates and notifications from online service providers, and/or how private ecosystem apps communicate with apps external to the private ecosystem.

According to one aspect of the invention, the plurality of apps installed on a mobile device may be integrated into a single suite of apps comprising the private ecosystem. Although the apps are integrated into a single solution, each app within the suite of apps provides targeted functionality. In other words, the ecosystem provides a single point of access to operate multiple apps that each provide targeted functionality. By combining the targeted functionality of each app with the convenience of an integrated suite, the ecosystem provides an intuitive operating experience for the user.

Figure 2:
FIG. 2 is an illustration of an app wheel in accordance with one embodiment of the invention.

FIG. 2 depicts an "app wheel" in accordance with one embodiment of the invention. In one aspect of the invention, the "app wheel" provides a user interface for displaying all the apps integrated within the app suite. The app wheel provides a convenient and intuitive way for users to access apps within the ecosystem; users need only remember where a single app is, and after selecting the app, the app wheel displays all the other apps associated with the ecosystem. Integrating the apps into an ecosystem also reduces the consumption of the computer resources, enhances navigation between apps, improves branding consistency, and facilitates the sharing of information between apps.

Figure 3:
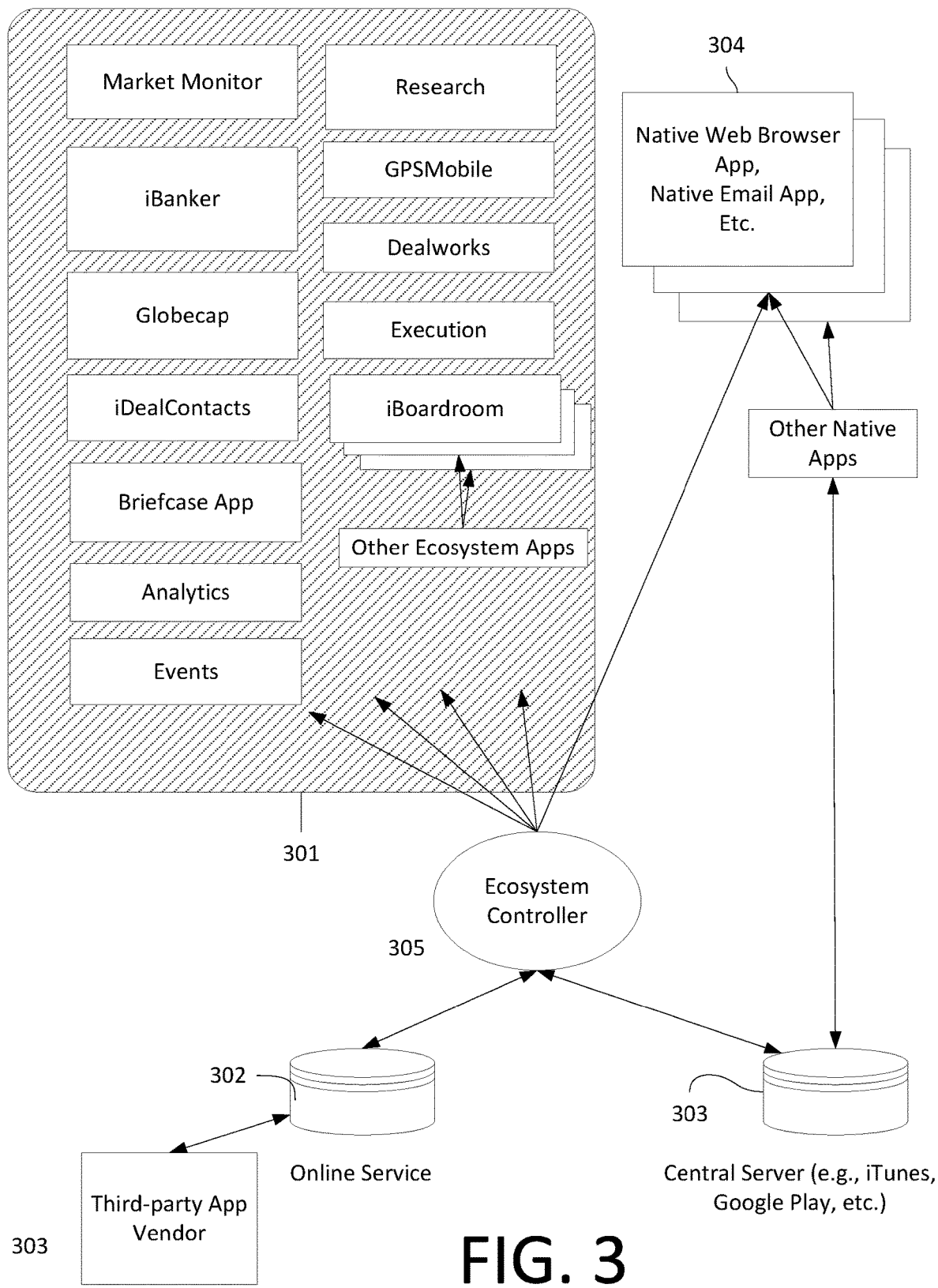
FIG. 3 is a block diagram illustrating components of a restricted mobile application ecosystem in accordance with an embodiment of the invention.

FIG. 3 is a block diagram illustrating components of a mobile application ecosystem in accordance with an embodiment of the invention. The ecosystem includes a collection of ecosystem apps 301, an ecosystem controller 305, an online service 302, native apps, 304, a central server 303, and a third-party app vendor 306. FIG. 3 illustrates that the ecosystem may integrate a group of ecosystem apps 301 and native apps into a suite of apps. The collection of apps 301 depicted in FIG. 3 (GPSMobile, iBanker, Globecap, iDealContacts, Briefcase App, Analytics, Events, Market Monitor, Research, Boardroom, Dealworks, Execution, and iBoardroom) is an example of a group of apps originating from a third party app vendor 306. The third-party app vendor 306 may distribute the apps through the online service 302. A central server 303 may be used to distribute native apps 304 to the user. The collection of apps 301 may communicate directly with an online service 202 independently from the native apps 304 external to the collection of apps 301. Thus, the ecosystem enables third-party app vendors to provide a restricted network (or otherwise restricted framework operable over the private or public network) for privately distributing proprietary applications, content, or data to users. Moreover, the ecosystem allows vendors to offer applications, content, or data as an integrated suite.

In embodiments of the invention, the vendor may associate a suite of apps based on account information held by the vendor. For example, a user may have an account at a vendor, such as JP Morgan. JP Morgan may distribute a collection of apps, such as a research app, a banking service app, and a financial trade managing app, to the user based on information about the user's account with JP Morgan.

In one aspect of the invention, the ecosystem controller processes information communicated to and from the online service providers, 302. The ecosystem controller may be used to initiate a download of a mobile application 301 from the online service 302. The ecosystem controller may also detect the install status of other apps within the suite of apps, and manage updates for other apps previously installed on the mobile device. Thus, an ecosystem simplifies the process of updating and maintaining the components encompassed in the suite; the ecosystem controller may automatically maintain updates and modifications for each app provided by the third-party vendor. Moreover, the ecosystem may allow the online service to push updates or modifications directly to the user. Furthermore, an ecosystem may enable vendors to communicate applications, content, or data to users across multiple different platforms. The ability to detect the install and update status of other apps plays in an important role in the ecosystem controller in its interapp awareness. That is, the ability for a single app to be aware of other apps internal and external to the ecosystem is an important feature in embodiments of the invention, because it allows user to navigate, maintain, and utilize multiple related apps in a convenient, intuitive manner. App updates may be optional or mandatory. Users may use the ecosystem controller to control which apps are installed or launched on the mobile application. App updates may also be downloaded from online service providers.

In one embodiment of the invention, the online service providers 302 may be specialized or private appstores, e.g., "Enterprise Appstores," such as a JP Morgan ("JPM") appstore. Enterprise Appstores allow companies and organizations to distribute proprietary, in-house apps, to a controlled group of mobile device users, such as to certain employees. In one aspect of the invention, the Enterprise Appstore may further control the apps that are distributed to employees according to various subcategories. For example, the Enterprise Appstore may make managerial apps available to executive or senior employees, while restricting the managerial apps from lower level employees. Thus, the private ecosystem may enable companies and organizations to provide different suites or bundles of apps to different users. In one aspect of the invention, the Appstores may push updates or installations from online services onto the user's mobile device. In another aspect of the invention, the online services may comprise private networks, inaccessible to the general public. This allows companies and organizations to distribute apps that may contain sensitive, confidential, or proprietary information over a private network, eliminating any risk that the companies or organization would otherwise be exposed to, had the apps or information been made available through a public central server provider 303, such as iTunes, for example. In yet another aspect of the invention, the online services may communicate any information, including without limitation, computer applications, content, URL schemes, or data to the ecosystem controller. In another embodiment of the invention, the online services may communicate to the ecosystem controller over a network such as the internet or an intranet.

In another embodiment of the invention, the online service providers 302 may be a publicly available Appstore, such as the Apple iTunes appstore. Although these Appstores may be public, apps distributed through such Appstores according to the invention may be proprietary, in-house apps, intended for a controlled group of mobile device users, such as employees, and intended to be for internal use. According to one aspect of the invention, apps be associated into a collection of apps, i.e., a suite, and distributed through a publicly available online service provider, using URL Schemes. That is, a suite of apps intended for a specific audience of users may all have a URL Scheme, sharing a common URL root. For example, a JP Morgan research app distributed through a publicly available online service provider, such as iTunes, may be associated with a URL bundle identifier, such as "com.jpmorgan.research". Other JP Morgan apps may be associated with the research app, into a JP Morgan suite of apps, by associating each app with the "com.j pmorgan" URL root. In one aspect of the invention, vendors may control access to the proprietary apps through the publicly available appstore. For example, a user may be required to provide employee credentials, such as their employee name, number, ID or password, before downloading apps part of the ecosystem suite. According to yet another aspect of the invention, apps distributed through the commercial Appstores may communicate with each other in the same or similar manner as apps distributed through the private Appstores.

Figure 4:
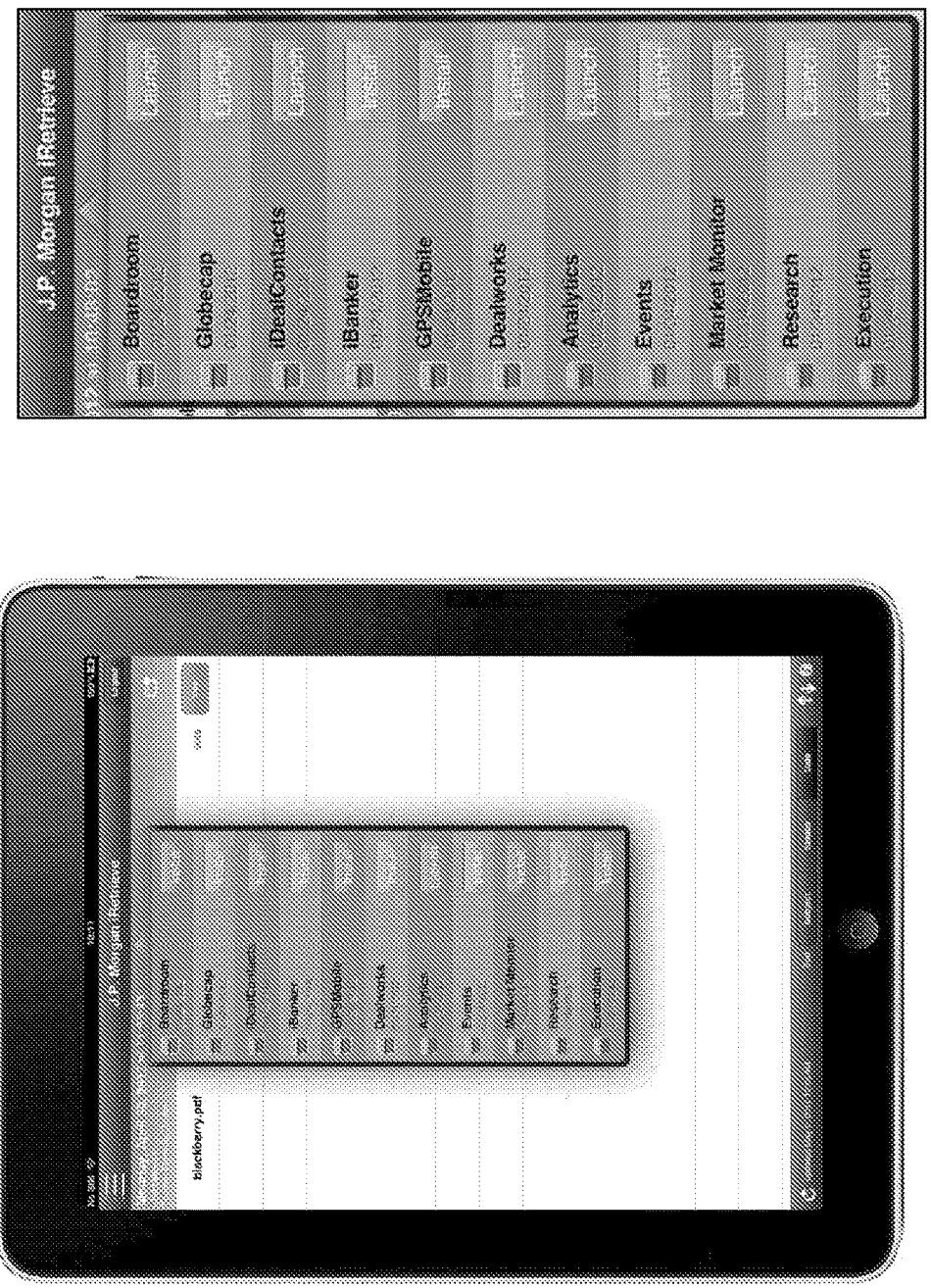
FIG. 4 is an illustration of an ecosystem controller menu in accordance with one embodiment of the invention.

FIG. 4 illustrates an interface for controlling the ecosystem controller to install, update, or launch an app with a dropdown menu in accordance with one embodiment of the invention. FIG. 4 depicts a private ecosystem dropdown menu displaying mobile applications within the private ecosystem. In one aspect of the invention, this menu may be configured to be accessible from any app that is part of the ecosystem (suite of apps). That is, the ecosystem dropdown menu may be always available. It will be apparent to those of ordinary skill in the art that the ecosystem controller is not limited to controlling the install, update, or launch of apps with a dropdown menu; the ecosystem controller may be implemented by any array of graphical user interface components, as readily understood by persons of skill in the art.

The ecosystem controller menu can display a list of apps installed on the mobile device. In another aspect of the invention, the ecosystem controller menu can display a list of apps available for the user to download. These apps may be apps within the private ecosystem, although they may also include apps external to the ecosystem, at the discretion of the third party vendor-distributor. In yet another aspect of the invention, this list may be customized to display any permutation of external or ecosystem apps, either installed or available to install. In one embodiment of the invention, the ecosystem controller menu may limit the apps to display according to a list made available by a third party, such as the online service provider, or an app developer. For example, an online service provider may define a list of apps that comprise their restricted ecosystem, and may make this list available by publishing or distributing the list from a remote server.

In one aspect of the invention, the user can navigate quickly and directly between apps by initiating the ecosystem controller menu. A user may initiate the ecosystem controller menu from a pop-over menu selectable from a source app, as illustrated in FIGS. 4. The pop-over menu may then display an ecosystem controller menu of ecosystem apps installed on the mobile device. A user may then select an app to launch directly from the ecosystem controller menu. Thus, a user may launch a target app directly from within a source app. The user does not have to exit the source ecosystem app and search through home screens for the target ecosystem app. This enables fast and convenient switching between apps.

Figure 5:
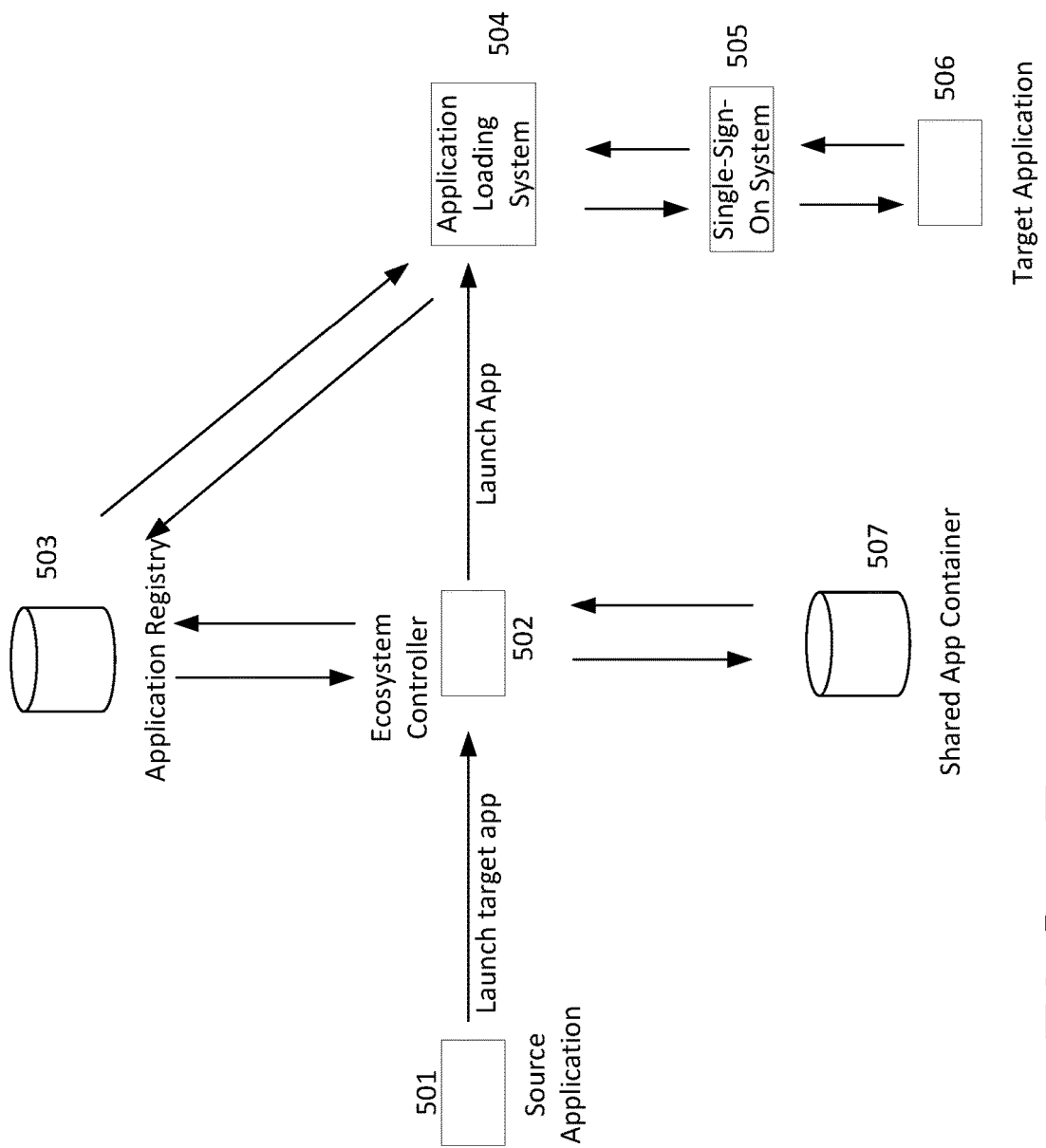
FIG. 5 is an illustration of switching between software applications in accordance with one embodiment of the restricted mobile application ecosystem.

FIG. 5 illustrates the mobile user device system components for launching a target app from a source app in accordance with one embodiment of the invention. The system includes a source app 501, and ecosystem controller 502, an application registry 503, an application loading system 504, a single-sign-on system 505, a target app 506, and a shared app container. The source app 501 communicates to the ecosystem controller 502 to invoke a target app 506. The ecosystem 502 communicates with the application registry 503 and application loading system 504 to begin execution of target app. The application loading system 504 invokes applications by loading applications onto the computer processor on the mobile device. The single-sign-on system 505, as described in more detail below, transfers a user's credentials or prompts the user for credentials to authenticate the user into the target app. The shared app container 507 may be used for passing to target 506.

In one embodiment of the invention, the application loading system is a URL Loading System. In one embodiment of the invention, the application registry may be created by the ecosystem controller. The application registry 503 may specify the apps that comprise the private ecosystem. The application registry 503 may specify apps corresponding to multiple, different private ecosystems or suites, according to another aspect of the invention. In one embodiment, the registry specifies the apps of the ecosystem according to custom URL schemes. That is, URL schemes may be used to identify which apps are associated with a particular suite or package of apps. For example, in the Apple iTunes Provisional Portal, apps with a bundle identifier, i.e., URL scheme, "com.jpmorgan.research" may be associated with a suite of JP Morgan apps for conducting financial research. In one embodiment of the invention, the registry 503 may be located at a remote server. Apps may use custom URL schemes to define custom URL prefixes, by which the system associates an app with the URL prefix. For example, the URL scheme "mailto:" may be registered by the mobile device's native e-mail app. In this case, the URL Loading System will associate that native e-mail app with any request to process a "mailto:" URL. Moreover, apps may implement custom URL schemes to facilitate communications between apps. The custom URL scheme may define parts of a URL for conveying kinds of information, queries, fragments, or parameter strings. For example, the "mailto:" scheme may define how to convey an e-mail address, subject field, or message field. In another example, a research app may pass stock ticker information to a trading app by defining a stock ticker field in the URL scheme. In another example, a boardroom app may pass a document to a briefcase app by defining a document field. Those of ordinary skill in the art will appreciate that the invention is not limited to conveying application parameters or documents; any type of information may be conveyed in a URL. The way apps extract information from the URL is defined by the app's URL-handling routine. The URL-handling routine is executed when a URL is processed. In another aspect of the invention, apps may pass files and documents to and from Web services using a URL scheme. Apps may pass context data and information to and from Web services as URL parameters. In other embodiments of the invention, the apps may store context data and information in the shared app container 507, and pass the location of the data or information in the shared app container as a URL parameter.

In one aspect of the invention, the URL scheme may be downloaded to the mobile device from an online service provider. This provides apps the flexibility to modify URL schemes as needed. Moreover, it allows an ecosystem to maintain URL schemes without requiring participation by the user.

In another embodiment of the invention, files and documents may be passed between apps using a Document Interaction Controller (not shown on FIG. 5). A Document Interaction Controller provides support for managing interactions with files in the local system via a user interface. The Document Interaction Controller presents an appropriate user interface for previewing, opening, copying, or printing a specified file. After presenting a user interface, a Document Interaction Controller handles all interactions needed to support file preview and menu display. One example of a Document Interaction Controller is the UIDocumentInteractionController defined by Apple's iOS Developer Library The invocation of the target app 506 is initiated by sending the mobile device's processor an instruction to open a URL. The processor services this instruction through the URL Loading System. The URL Loading system consults the application registry 503 and resolves the app associated with the URL scheme. The URL Loading System launches the target app 506, passing the app the URL. The app launches, executing the URL-handling routine, and extracts information conveyed in the URL.

In another aspect of the invention, the ecosystem provides animations and graphics when users navigate between apps launched from the ecosystem controller menu. These animations and graphics enhance the user experience when navigating between apps within the ecosystem or external to the ecosystem.

Figure 6:
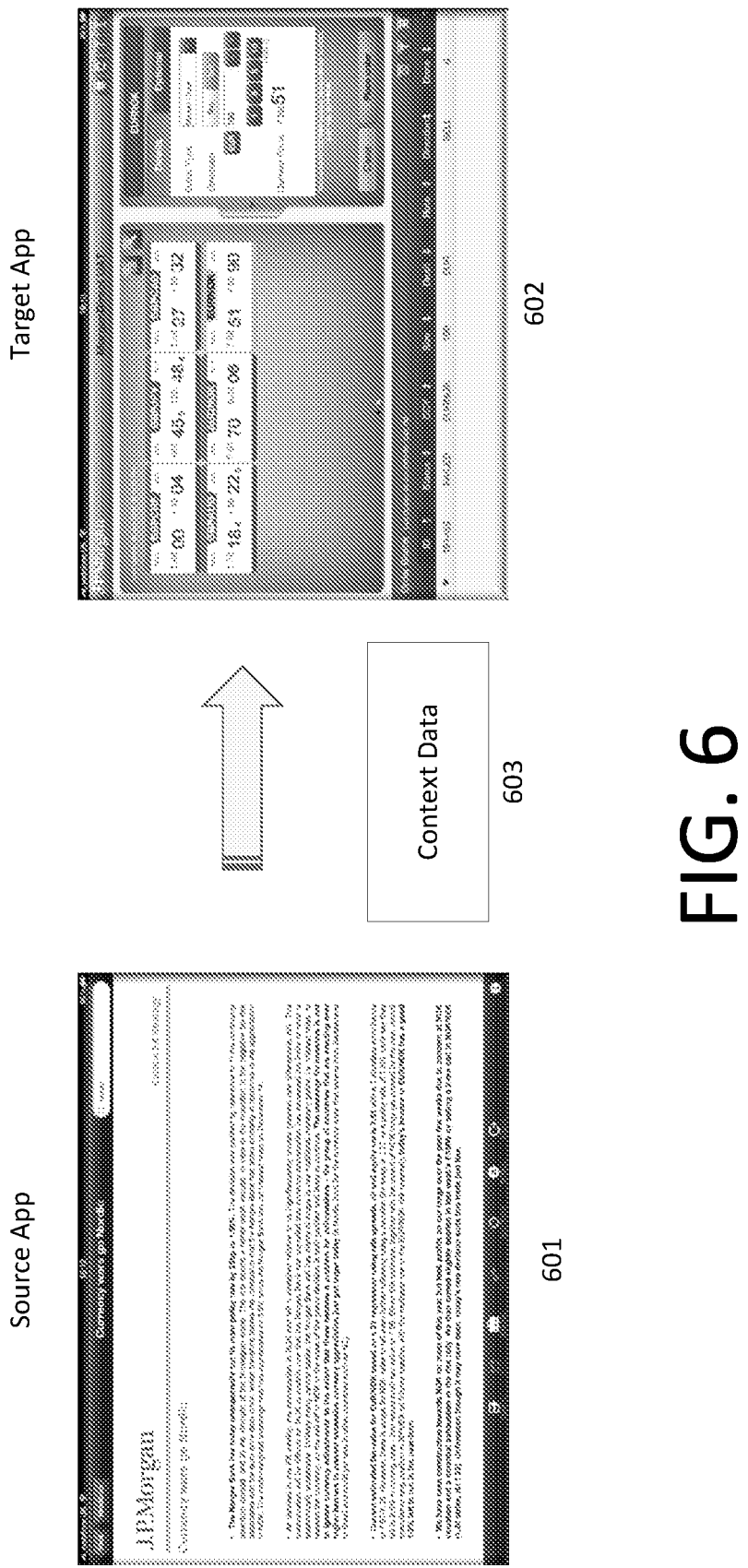
FIG. 6 is an illustration of transferring data between software applications in accordance with one embodiment of the restricted mobile application ecosystem.

FIG. 6 illustrates passing context or data from a source app to a target app for a target app to load upon launch in accordance with one embodiment of the invention. FIG. 6 depicts a source app 601 and target app 602. The source app 601 launches the target app 602, passing context data 603 in the manner described above. This enables apps to automatically load context or content data upon launch. In context data passing, a user may select information from within a source app to view in a target app. The ecosystem controller passes this information to the target app upon launch (i.e., launching with context). For example, a user viewing stock ticker information in a source app such as a research app may wish to view the stock information in a target app such as a foreign currency trading app. A user may launch the foreign currency trading app with the stock ticker information directly from the research app as illustrated in FIG. 6. The ecosystem controller passes the currency symbols from the research app to the foreign currency trading app to automatically load the stock ticker information upon launch.

Figure 7:
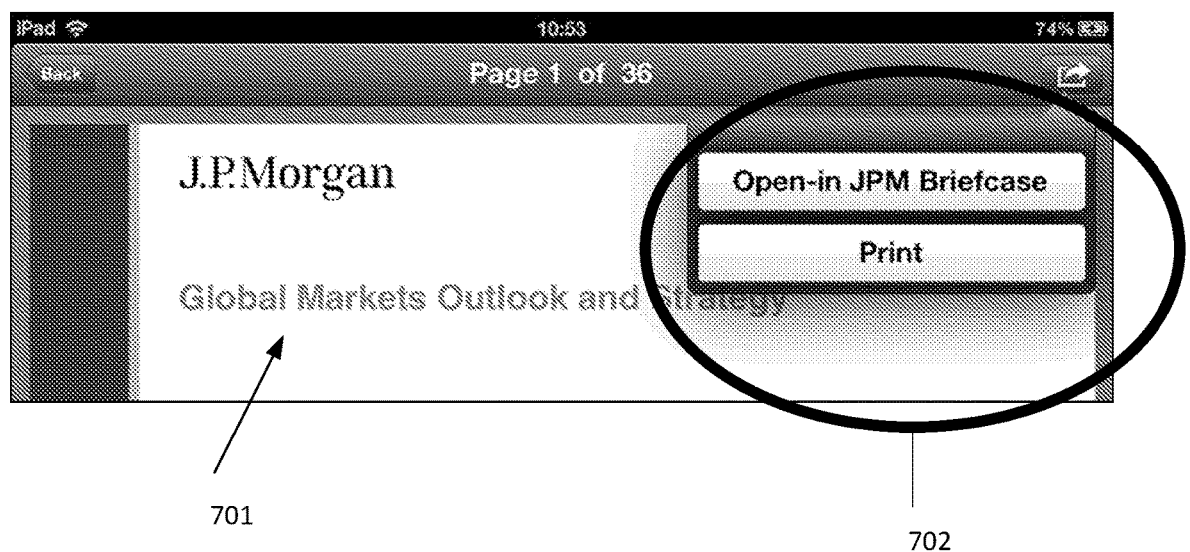
FIG. 7 is an illustration of transferring data for a specific purpose in accordance with one embodiment of the restricted mobile application ecosystem.

FIG. 7 illustrates passing context data for launching target apps with a specific purpose in accordance with one embodiment of the invention. FIG. 7 depicts a source app 701 and an ecosystem controller menu 702. The ecosystem controller menu may provide the option for passing context data in source app 701 with a specific purpose. For example, the ecosystem controller menu 702 may provide the user an option to print data viewed in a research app 701. When a user selects the print option from the dropdown menu, the ecosystem controller menu 702 passes the information to a target printing app (not shown). The printing app may then automatically print the data passed from the source app.

In one aspect of the invention, context data or files and documents may be flagged with attributes that control how the context data or files and documents may be used. For example, document or context data attributes may be restrictions that limit a user's editing or reading rights. As another example, document attributes may be used to restrict whether a document may be printed.

In another aspect of the invention, apps may pass data with a file or document that specifies further restriction types or additional functionality. In one embodiment of the invention, the data may be a dictionary of key-value pairs that specify how the file or document is restricted. Apps may populate the dictionary keys with any set of values as necessary and pass the set of key-value pairs to another app. For example, to restrict the ability to print a file being passed from one app to another app, the app may additionally pass a key-value pair, where the key specifies the printing functionality, and the value is set to limit the printing capability of the document. In this way, an app's functionality may be extended by controlling how an app may react or respond to data. Thus, passing dictionary key-value pairs between apps provides flexibility by allowing source and target apps to be extensible.

In another aspect of the invention, the ecosystem may restrict which apps may receive files, documents, or context data. The apps that may receive files, documents, or context data may be maintained as a list, e.g., a "Whitelist". In one embodiment of the invention, the ecosystem controller may maintain a Whitelist by creating a list of unique identifiers associated with each app in the ecosystem. Thus, the Whitelist may be used to distinguish between approved internal ecosystem apps, and apps external to the ecosystem that are not approved for receiving files, documents, or context data. When a user attempts to transfer data from a source ecosystem app to a target non-ecosystem app, the ecosystem controller may determine whether the app is approved to receive the data using the Whitelist and can prevent the transfer of the file, document, or context data. In another embodiment of the invention, the Whitelist may be maintained remotely on a server of the online service providers. Restricting the passing of files, documents, and context data with apps external to the ecosystem in this way enhances the security of the ecosystem.

In one aspect of the invention, when an ecosystem app is passing a file, document, or context data to or from a non-ecosystem app, the ecosystem app may encrypt the document or data and store the document or data in an encrypted state. In this way, the ecosystem controller may prevent the unintentional exposure of files, documents, or data to the operating system. This may occur, for example, when a file or document has an exported file type association, i.e., an exported Uniform Type Identifier ("UTI") file type. In other embodiments of the invention, the data may be pasteboard or clipboard data that the user is passing to a target app. In the same manner as described above, the ecosystem may securely pass the pasteboard or clipboard data between applications by encrypting the data. In this way, apps external the ecosystem will not be able to process this data.

Similarly, when a user selects from a source app a document to view with a target app, the ecosystem controller may pass the content of the document to the target app. For example, a user viewing a news article in a research app may wish to pass the content of the article to a briefcase app for viewing. The briefcase app may then launch, displaying the article content passed from the research app.

In one aspect of the invention, the ecosystem controller provides the user a list of apps compatible with the type of the information content being accessed. For example, when a user attempts to view a PDF document, the ecosystem controller menu displays a list of apps capable of viewing PDF documents. In one aspect of the invention, the ecosystem controller may determine the compatibility of apps and information content by comparing the extensions of the files. In another aspect of the invention, the ecosystem may define a file type extension that is only compatible with the ecosystem. That is, only apps belonging to the ecosystem may launch these file type extensions. In another aspect of the invention, the ecosystem detects which apps are compatible with the file type extensions and adapts the ecosystem controller menus dynamically. The ecosystem controller may provide the user a list of external apps compatible with the type of the information content. For example, the ecosystem controller menu may display the mobile device's native mobile browser, an app external to the ecosystem, to open a web address.

Figure 8:
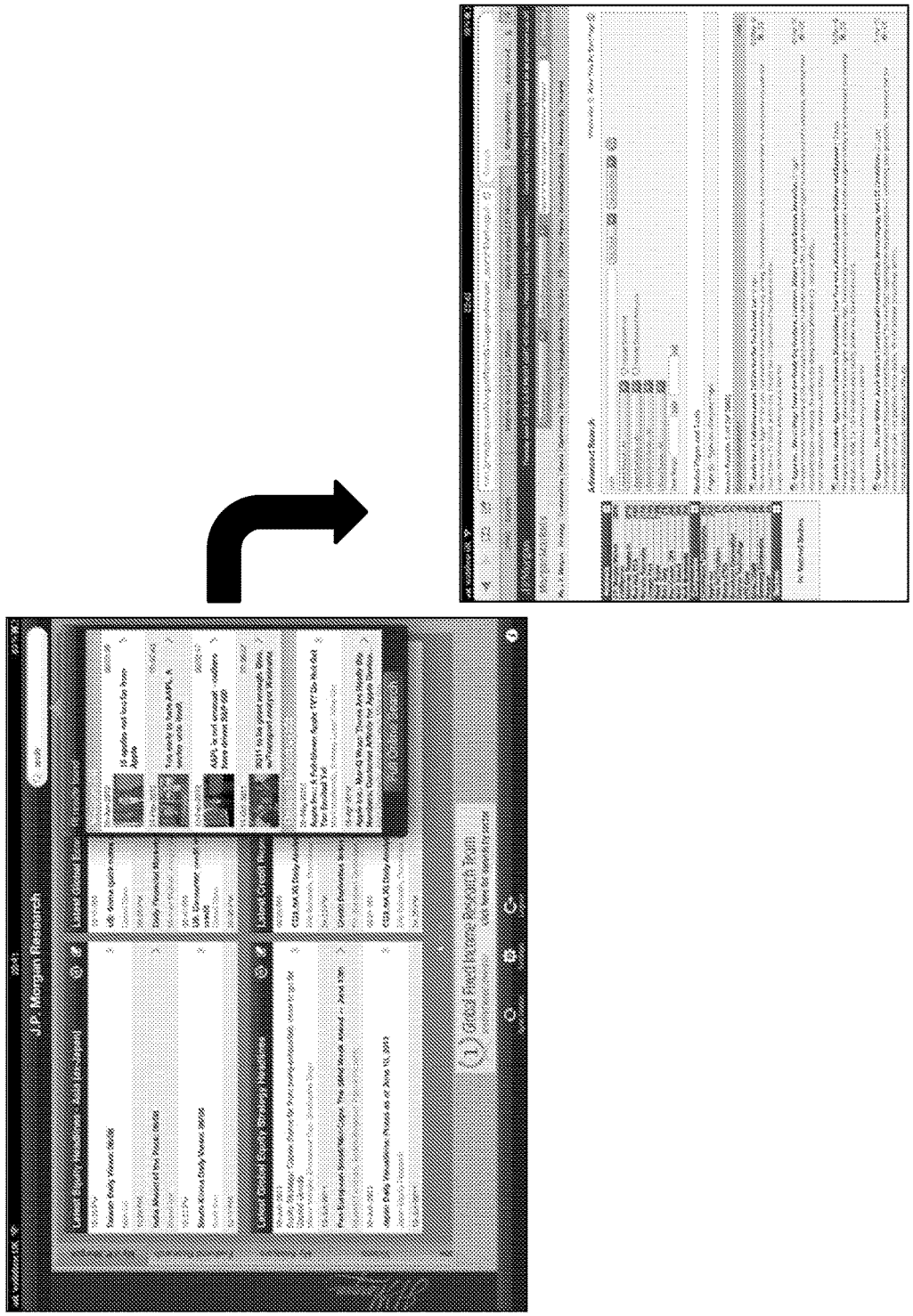
FIG. 8 is an illustration of transferring data between ecosystem software applications and nonecosystem software applications in accordance with one embodiment of the restricted mobile application ecosystem.

FIG. 8 illustrates sharing information between a source app contained in the ecosystem and a target app external to the ecosystem in accordance with one embodiment of the invention. The ecosystem controller has been described thus far in terms of its capability to navigate, operate, and share information between apps within the private ecosystem. However, in another aspect of the invention, the ecosystem controller may share information between a source app contained in the ecosystem and a target app external to the ecosystem. In one aspect of the invention, a user may launch apps external to the ecosystem directly from the ecosystem controller menu, enabling fast and convenient switching between mobile apps. For example, a user may launch a native web browser from a research app as illustrated in FIG. 8. The ecosystem controller also allows apps to pass context or content data when switching between apps within the ecosystem and apps external to the ecosystem. Moreover, the ecosystem controller can also launch external apps to perform a specific function. Similarly, the ecosystem controller may pass the content of a document to an external target app.

In one embodiment of the invention, the ecosystem controller enables source apps to launch and pass information to Web services, i.e., Web apps. Web services may be services that respond to a service request over a network. For example, in one embodiment of the invention, a Web service may be a search engine that provides responses to ordinary online search queries over the internet. The results returned from this type of Web service may be normal Web search results that may be viewed in a browser. In another embodiment of the invention, a Web service may be a custom service that is customized to a particular app. Apps may submit service requests to the customized Web service using a custom set of URL parameters. The custom Web service may then provide a customized response that allows the particular application to display the custom results. FIG. 8 depicts a Web service app after it has been invoked from a source app.

Using the application loading system described above, the source app may invoke a Web service. For example, a source app may submit a search query to a Web service via the application loading system. In one embodiment of the invention, the application loading system is a URL Loading System. The invocation to the Web service is initiated by sending the mobile device's processor an instruction to submit a request to a Web service specified by a URL. The processor services this instruction by sending an HTTP request to the Web Service located at the specified URL. The ecosystem controller enables source apps to pass data and/or context information from and to the Web service. In one embodiment of the invention, the data and/or context information may be passed to the Web service as a parameter appended to a URL.

Similarly, the ecosystem controller allows Web services to return data/context information to the source app via the URL Loading System for the ecosystem to display. For example, after a source app submits a search query to a Web service, the ecosystem controller may display the search results within the ecosystem controller menu. Users may view or select the individual Web service results.

Figure 9:
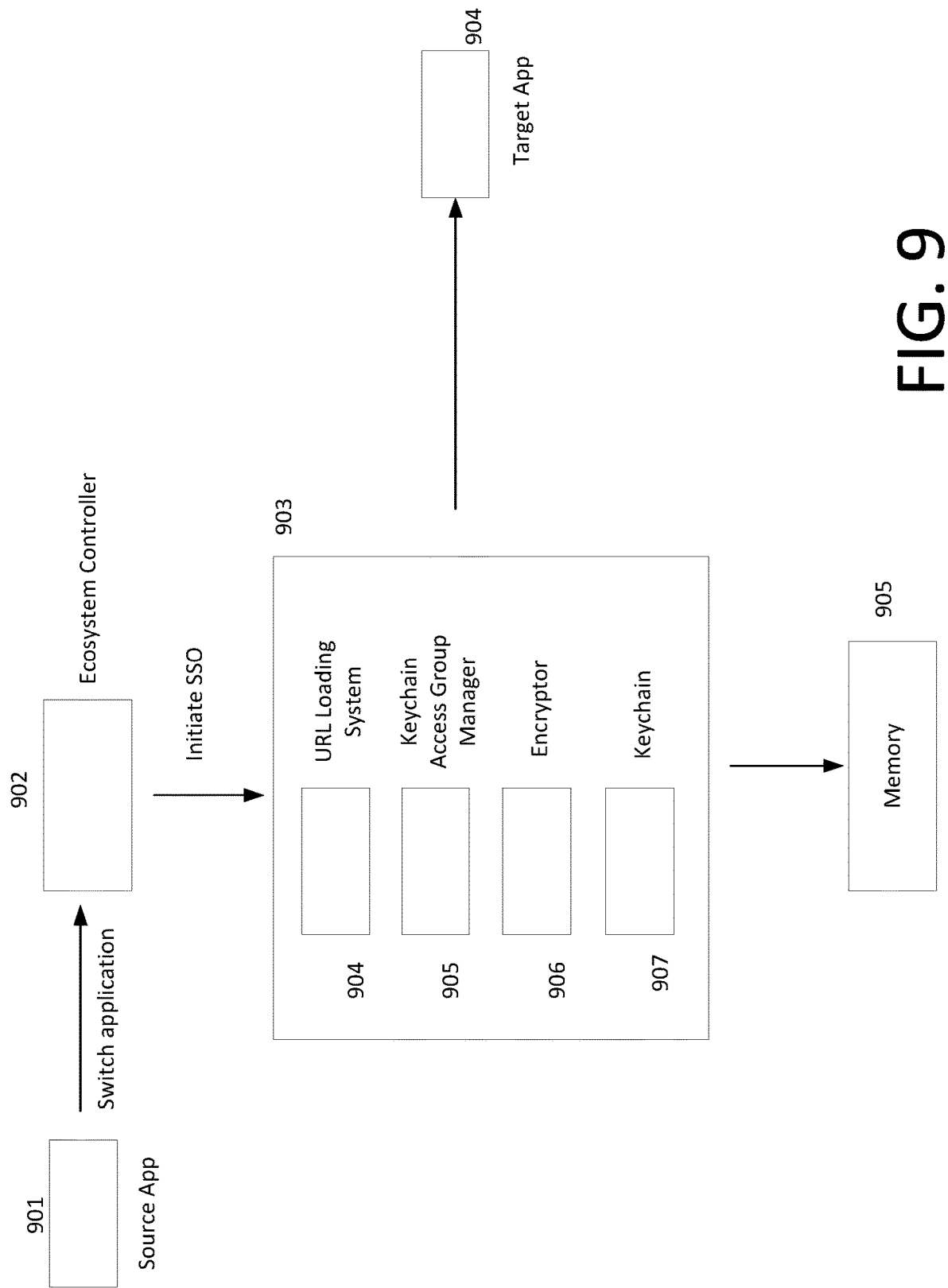
FIG. 9 is an illustration of transitioning between software applications in accordance with one embodiment of the restricted mobile application ecosystem.

FIG. 9 illustrates authenticating a user with a single-sign-on system when launching a target app from a source app, in accordance with one embodiment of the invention. FIG. 9 depicts a source app 901, an ecosystem controller 902, a single-sign-on system 903, a target app 904, and a memory 905. The single-sign-on system comprises a URL Loading System 904, Keychain Access Group Manager 905, Encryptor 906, and Keychain 907. The source app 901 communicates to the ecosystem controller 902 to launch a target app 904. The ecosystem communicates to the single-sign-on system to authenticate the user before executing the target app 904. As described in more detail below, components 904-907 of the single-sign-on system 903, and memory 905, receive user credentials, and authenticates a user based on the credentials before executing the target app. In one aspect of the invention, the single-sign-on system enables the ecosystem controller 902 to automate user authentication when switching between apps. When a user has entered credentials to use a source app, the ecosystem controller uses the source app credentials to log into or otherwise access a target app. Thus, a user is not required to authenticate every app that requests access to information. For example, if a user has authenticated into a research app, and subsequently launches a real time market monitor app to complete an action, the ecosystem will automatically log the user into the real time market monitor app. In one aspect of the invention, after a specified amount of time has elapsed, the single-sign-on functionality automatically turns off, and requires a user to reauthenticate. For example, if a certain amount of time elapses without any user interactivity, the single-sign-on functionality can effectively log a user off, and require a user to reauthenticate before switching to another ecosystem app.

According to another aspect of the invention, the ecosystem controller may be configured to require reauthentication for apps that require different security levels, such as a heightened access control, or different customized authentication schemes, such as an RSA SecureID®. For example, a foreign currency trading app may have a heightened security level than other apps within the ecosystem, and may further require users to authenticate via an RSA SecureID® token. The ecosystem controller may be configured to require users to reauthenticate themselves and provide an RSA SecureID® Token when launching a foreign currency trading app and validate that the user has the authority required for the heightened level of access.

In other embodiments of the invention, the different authentication schemes may further include fingerprint identification or biometric scanning. Biometric authentication may be used to replace username and password credentials using a desktop computer and a camera-equipped mobile device. Instead of prompting a user for username and password credentials on a desktop computer, the desktop computer may display a scannable bar code, such as QR-code. Using the camera-equipped mobile device, the user may then scan the bar code. After scanning the bar code, the user then scans a biological characteristic or trait that serves as the biometric, such as the user's retina. After scanning the user's biometric, the mobile device analyzes the biometric and then determines whether the user is authenticated. The mobile device uses the information encoded in the barcode to communicate to the desktop computer and authenticate the user.

In other embodiments of the invention, the single-sign-on functionality may be configured to operate on the function level. That is, the ecosystem controller may be configured to require reauthentication when apps perform certain functions that may require different security levels or customized authentication schemes. For example, every time an app is used to make a trade, the ecosystem controller may require reauthentication. If not making a trade, the user can continue to use the app without interruption.

In one aspect of the invention, the single-sign-on functionality may be used to authenticate users with a network connection, i.e., online, or without a network connection, i.e., offline. When a user is offline, a user may securely switch between apps and pass data between the apps in the manner described above. In one example, a user may enter their credentials into one app, and using a network connection to connect to an network server or authorized data source (not depicted in FIG. 9), the app authenticates the user with the provided credentials. If the user were to subsequently disconnect the network connection, i.e., go offline, the single-sign-on functionality allows the user to switch to and pass data to a second app without the need to enter their credentials again, and further, without requiring a network connection to connect to a server or authorized data source. In one embodiment of the invention, when the single-sign-on functionality is used to authenticate users offline, the ecosystem controller accesses cached or stored data that has either been created within the application or has been previously downloaded from an online authorized data source such as a Web service. In other embodiments of the invention, the data may be stored as an authentication cookie. Thus, when the ecosystem controller transitions between apps, executing the single-sign-on functionality, authentication of the user may be based on the validity of the cookies as cached and encrypted.

In contrast, when a user is online, a user may authenticate into Web services with the single-sign-on functionality described above. For example, if a user is signed into a local app and launches a Web service that requires authentication, the single-sign-on functionality may automatically authenticate the user into the Web service. The single-sign-on functionality allows an app to communicate the user credentials to a Web service or server to access restricted or protected data sources. In one embodiment of the invention, the single-sign-on functionality may allow the user to access multiple protected resources with a single-sign-on. When users attempt to authenticate themselves using a network connection, the app may submit the user credentials to a Web service, in the manner described above. In one embodiment, cookies containing user credentials may be used to automatically the authenticate the user into the Web service. The Web service may be an authorized online data source, for example, or a customized Web service.

FIGS. 3-10-14 illustrate the details of the components and methods for a single-sign-on system to transfer authenticate users by passing user credentials when switching between apps. Those of ordinary skill in the art will appreciate that FIGS. 10-14 are not limited to user credentials; those of ordinary skill in the art will appreciate that FIGS. 10¬104 disclose systems and methods for transferring any kind of information securely between apps.

Figure 10:
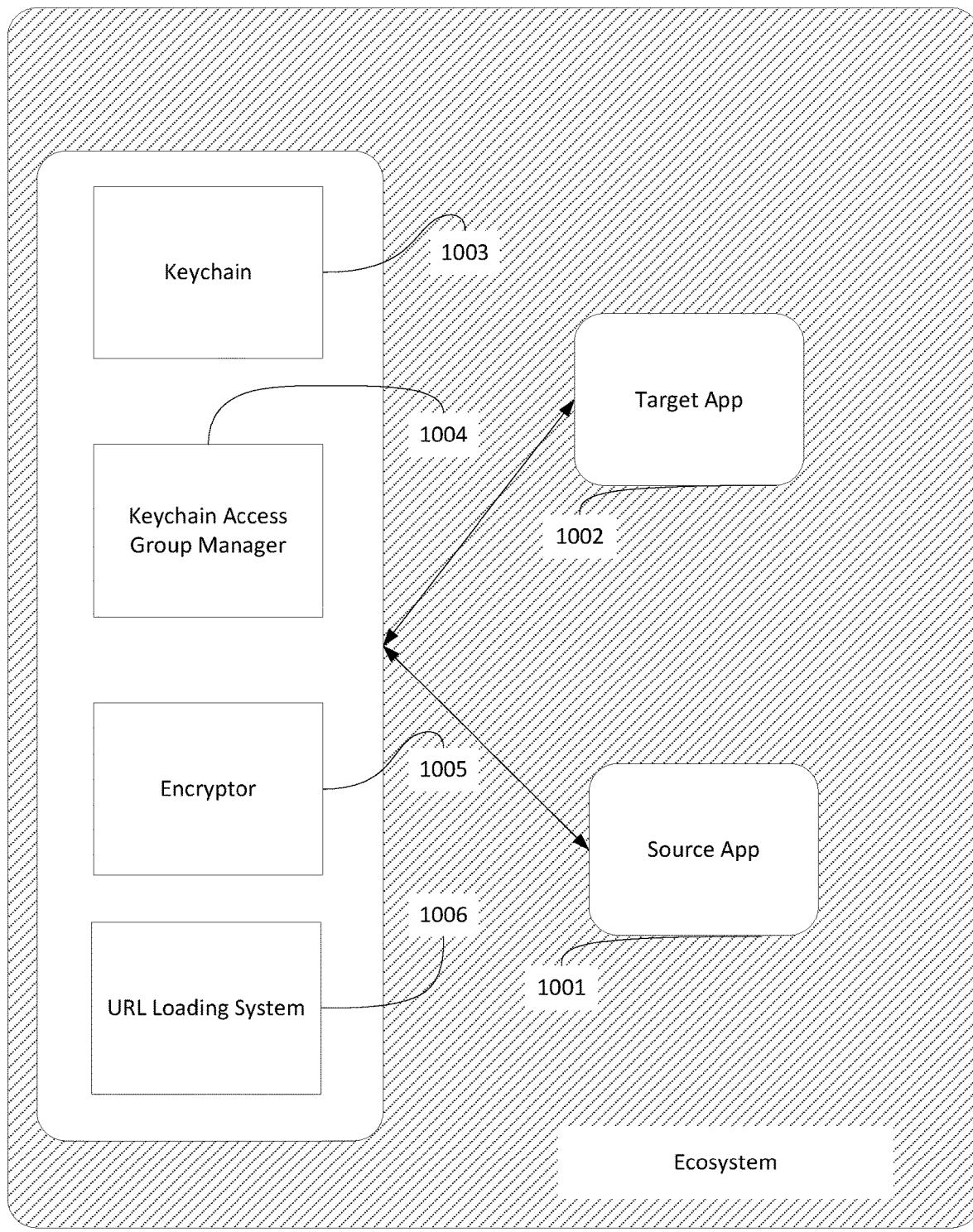
FIG. 10 is a block diagram illustrating the components for secure information sharing in accordance with an embodiment of the invention.

FIG. 10 illustrates the components of a single-sign-on system for implementing shared data transfer in an ecosystem in accordance with one embodiment of the invention. The components of the single-sign-on system include a source app 1001, a target app 1002, a Keychain 1003, a Keychain Access Group Manager 1004, an Encryptor 1005, and a URL Loading System 1006. The combination of the Keychain, Keychain Access Group Manager, Encryptor, and URL Loading System allows apps to securely share information between apps that are "sandboxed." As explained in more detail below, even though apps may be sandboxed, a target app and source app may share information through a Keychain, using Keychain Access Groups. The source app may determine a location in the Keychain to store the information, encrypt the information with the Encryptor, and then store the information at that location. The source app may then invoke the target app through the URL Loading System, and convey the storage location to the target app in the URL. In one embodiment, whereas the URL Loading System and URL Schemes provide the system for passing parameters and information between apps, the Keychain and Keychain Access Groups provide the system for passing credentials between apps. The target app may then extract the location information from the URL, and access the information stored by the source app.

In one embodiment of the invention, the shared information may be a user's authentication credentials. When the shared information is the user's authentication credentials, a target app may automatically authenticate the target app, without requiring the user to reauthenticate. In other words, by sharing the user's authentication credentials, the Keychain, Keychain Access Group Manager, Encryptor, and URL Loading System provide single-sign-on functionality.

The Keychain is an encrypted storage system that apps may use for storing and retrieving information, i.e., keychain items, shared between apps. The information may include sensitive information, such as usernames, passwords, cryptographic keys, and certificates. When the Keychain is used to store user credentials, an app may automatically retrieve and enter a user's credentials from the Keychain, streamlining the authentication process for users with multiple accounts and services. In one embodiment of the invention, the mobile device has only one Keychain. However, in their embodiments of the invention, a user or app may create an unlimited number of Keychains. In one embodiment of the invention, a mobile device may have access to multiple private ecosystems, each defined by a suite, and each having a Keychain for sharing sensitive information within that ecosystem of apps.

In one aspect of the invention, the Keychain restricts an app from accessing any keychain items other than its own. In another aspect of the invention, the Keychain allows keychain items to be shared with multiple apps through the Keychain Access Group Manager, and Keychain Access Groups. The Keychain Access Group Manager manages keychain access groups. A keychain access group is a group identifier that is associated with a group of apps. In some embodiments of the invention, the group of apps associated with the Keychain Access Group and Keychain Access Group Manager comprises the apps of the ecosystem. That is, the apps that are bundled within the ecosystem may be specified with the Keychain Access Group and Keychain Access Group Manager. When storing information on the Keychain, the Keychain may specify a keychain access group that has permission to retrieve the keychain item. Each app may identify a keychain access group to which it belongs. Apps may access any keychain item that is associated with the keychain access group to which it belongs.

The Encryptor provides functionality for encrypting information. In one aspect of the invention, the Encryptor may generate hashcodes of varying block sizes, using various encryption processes. One having ordinary skill in the art will appreciate that any hashcoding process may be used, such as, and without limitation, MD4, MD5, SHA-1 and SHA-2. In another aspect of the invention, the Encryptor may encrypt and decrypt messages using symmetric key encryption techniques. For example, the Encryptor may encrypt the message with 128-bit or 256-bit AES compliant encryption keys. One having ordinary skill in the art will appreciate that any symmetric key encryption process may be used, such as, and without limitation Twofish, Serpent, AES (Rijndael), Blowfish, CASTS, RC4, 3DES, and IDEA. In another aspect of the invention, the Encryptor may encrypt and decrypt messages using asymmetric key encryption techniques. For example, the Encryptor may encrypt messages using RSA public key cryptography. One having ordinary skill in the art will appreciate that any public key or other assymmetric/symmetric process may be used, such as, and without limitation, the Diffie—Hellman Key Agreement, Digital Signal Standard, and ElGamal processes.

As mentioned above, the Keychain, Keychain Access Group Manager, Encryptor, and URL Loading System allow apps to securely share information. Information is shared by first encrypting and storing the information on a location in the Keychain. In one aspect of the invention, the encrypted information is first temporarily stored in a computer memory for a short period of time before being stored in Keychain. After the encrypted information is stored in the Keychain, the encrypted information may then be wiped from the temporary memory. This allows the ecosystem controller to mitigate against memory dump attacks. The location information and the encryption key used to encrypt the data are then passed to a target app as a URL. The target app then extracts the location information and encryption key from the URL. The target app then locates the information, and decrypts the information using the encryption key. FIGS. 11-14, discussed below, illustrate this process in detail.

Figure 11:
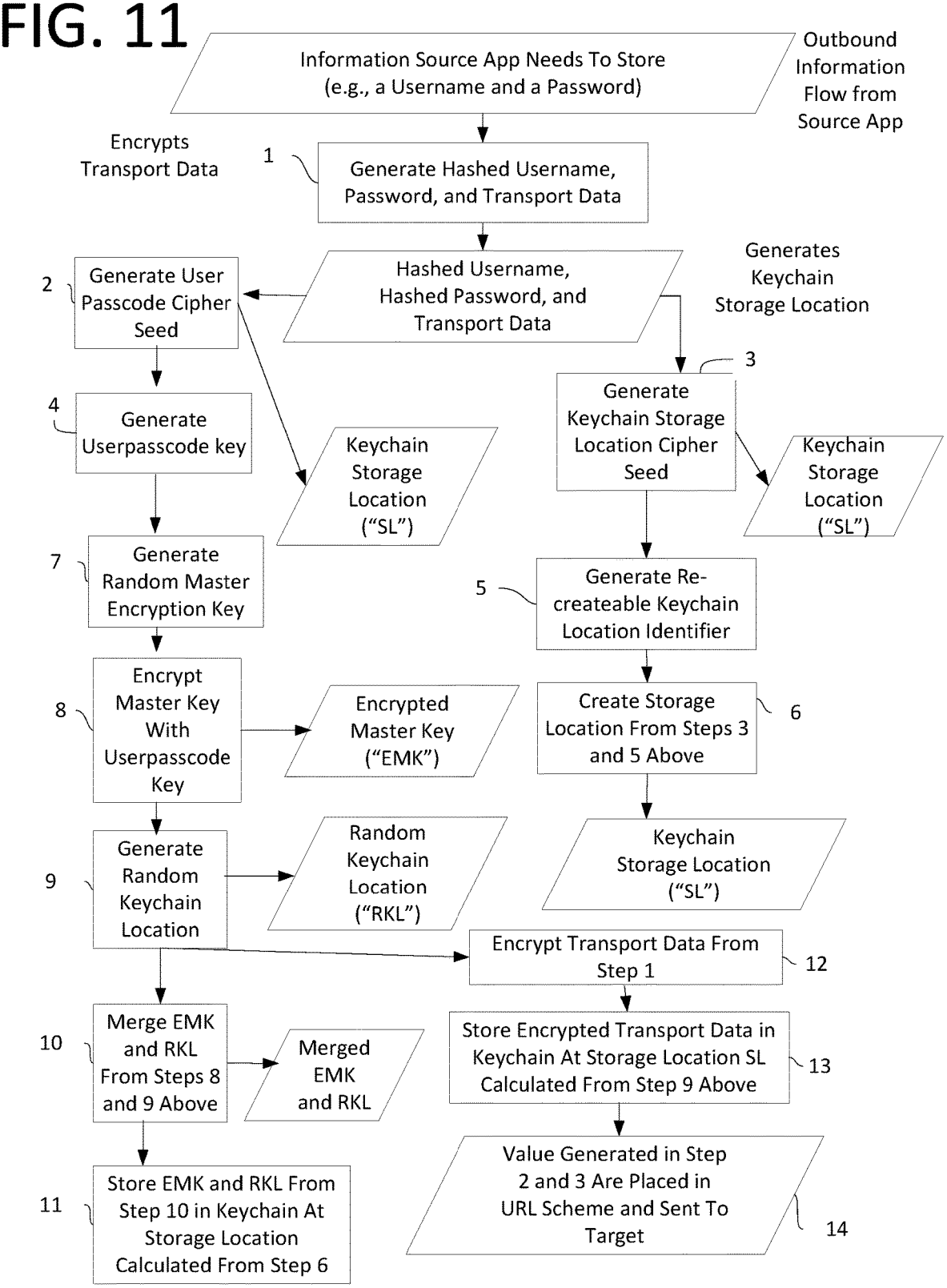
FIG. 11 is a flow chart illustrating an outbound single-sign-on authentication processing method in accordance with an embodiment of the invention.

FIG. 11 illustrates the process of a source app storing a user's authentication credentials in the Keychain for a target app to retrieve. As FIG. 11 shows, the process begins with encrypting the information to store. In FIG. 11, step 1, the Encryptor encrypt the information by generating a hashed username, password, and transport data. The hashed username, password, and transport data may be generated using any hashing encryption technique known in the art. In one embodiment of the invention, the Encryptor encrypts the username, password, and transport data into a 64 hexadecimal character message digest.

In FIG. 11, step 2, the Encryptor generates a User Passcode Cipher Seed for creating a User Passcode Encryption Key in step 4. In one embodiment, the hashed cipher seed may be a selected portion of the message digest, 16 hexadecimal characters long.

In FIG. 11, step 3, the Encryptor generates a Keychain Location Identifier. This Keychain Location Identifier is for encrypting the keychain item storage location. In one embodiment, the Keychain Location Identifier may be a selected portion of the hashed password generated in step 1, 16 hexadecimal characters long.

In FIG. 11, step 4, the Encryptor generates a User Passcode Key. This encryption key is for encrypting and decrypting a Master Encryption Key. In one embodiment of the invention, the User Passcode Key is a 256-bit key for encrypting a message in accordance with the AES encryption standard. The 256-bit AES encryption key may be generated using the User Passcode Cipher Seed generated in step 2 as an initial value.

In FIG. 11, step 5, the Encryptor encrypts the Keychain Location Identifier generated in step 3 by generating an Encrypted Keychain Location Identifier. In one embodiment of the invention, the Encryptor encrypts the Keychain Location Identifier by hashing the Keychain Location Identifier. The hashed Keychain Location Identifier may be generated using any hashing encryption technique known in the art. In one mbodiment of the invention, the Encryptor hashes the Keychain Location Identifier into a 64 hexadecimal character message digest.

In FIG. 11, step 6, the Encryptor combines the 16 hexadecimal character Keychain Location Identifier and the 64 hexadecimal character hashed Keychain Location Identifier message digest into a Master Encryption Key Storage Location. This Storage Location indicates the location where the Master Encryption Key will be stored.

In FIG. 11, step 7, the Encryptor generates a Master Encryption Key. This encryption key is for encrypting and decrypting the transport data from step 1. In one embodiment of the invention, the Master Encryption Key is a 128-bit key for encrypting a message in accordance with the AES encryption standard. The 128-bit AES encryption key may be generated using the User Passcode Key generated in step 2 as an initial value.

In FIG. 11, step 8, the Encryptor encrypts the Master Encryption Key generated in step 7, with the User Passcode Key. In one embodiment where the Master Encryption Key is 128 bits, the message digest is a 248 Unicode-character long message digest.

In FIG. 11, step 9, the Keychain generates a Transport Data Keychain Location. The Transport Data Keychain Location specifies the location in the Keychain where the Transport Data will be stored. In step 10, the encrypted Master Encryption Key and the Transport Data Keychain Location are merged. In step 11, the encrypted Master Encryption Key and the Transport Data Keychain Location are stored in the Keychain at the location specified by the Master Encryption Key Storage Location generated in step 6.

In FIG. 11, step 12, the Encryptor encrypts the Transport Data from step 1 using the Master Encryption Key generated in step 7. In step 13, the encrypted Transport Data is stored in the Keychain at the location specified by the Transport Data Keychain Location generated in step 9.

In FIG. 11, step 14, the User Passcode Cipher Seed and Keychain Location Identifier are stored in a URL in accordance with the URL scheme defined by the target app. As explained below, the User Passcode Cipher Seed and Keychain Location Identifier are extracted from the URL in the target app, and used to decrypt the Transport Data Keychain Location and the Master Encryption Key.

Figure 12:
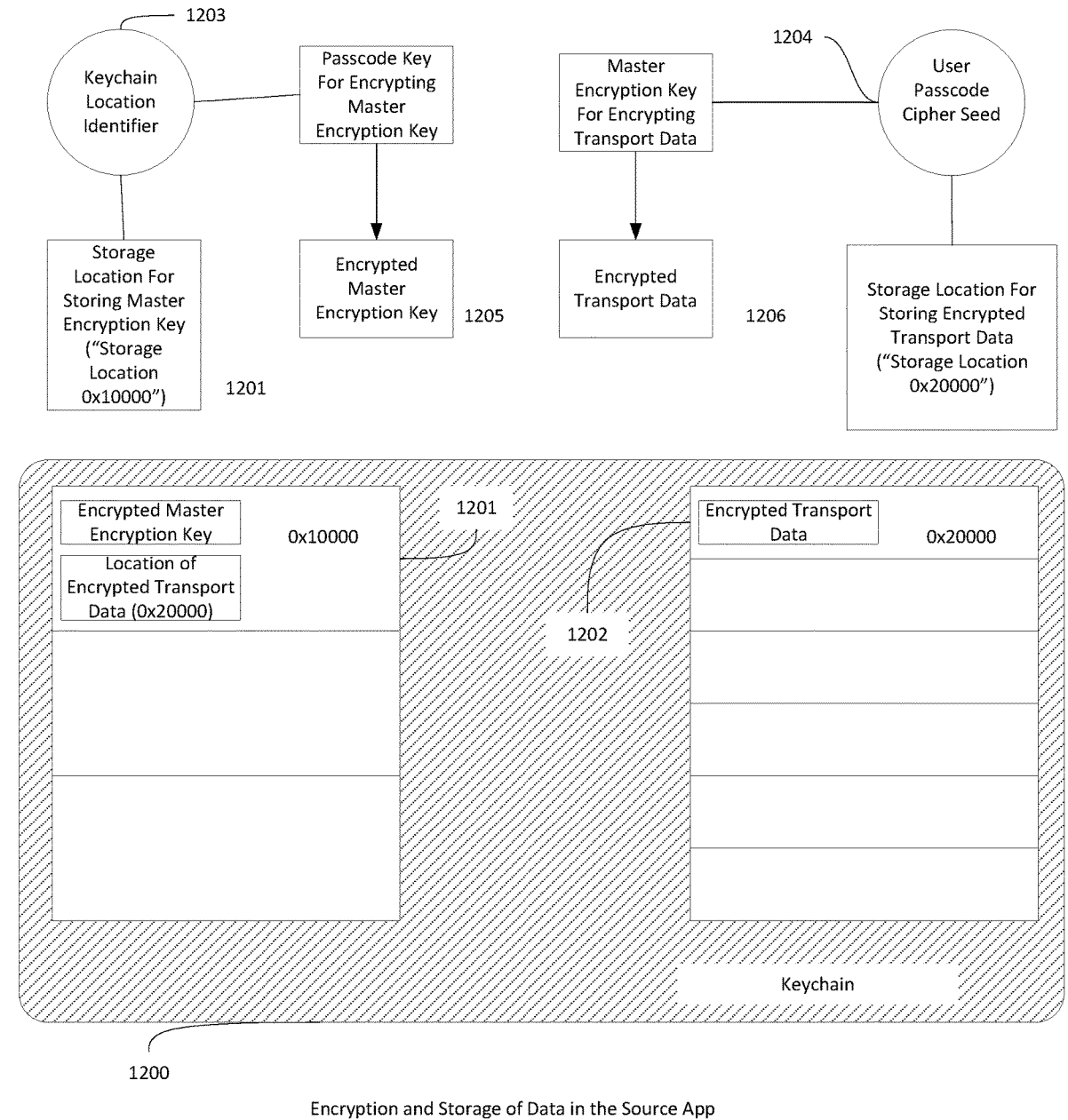
FIG. 12 is a block diagram illustrating the encryption and storage of information in a source app in accordance with an embodiment of the invention.

FIG. 12 is a block diagram illustrating how the User Passcode Cipher Seed is used to generate the User Passcode Key for encryption and storage of data in accordance with one embodiment of the invention. FIG. 12 depicts a Keychain 1200, a first location in Keychain memory 1201, a second location in Keychain memory 1202, a Keychain Location Identifier 1203, a User Passcode Cipher Seed 1204, an Encrypted Master Encryption Key 1205, and an Encrypted Transport Data 1206. The first location in Keychain memory 1201 is the location of the second location in Keychain memory 1202, and Encrypted Master Encryption Key 1205. The second location in Keychain memory 1202, is the location of the Encrypted Transport Data 506. The Keychain Location Identifier 1203 is used to generate the first location in Keychain memory 1201, and Encrypted Master Encryption Key 1205 as discussed above. The User Passcode Cipher Seed 1204 is used to generate the second location in Keychain memory 1202, and Encrypted Transport Data 1206 as discussed above.

Figure 13:
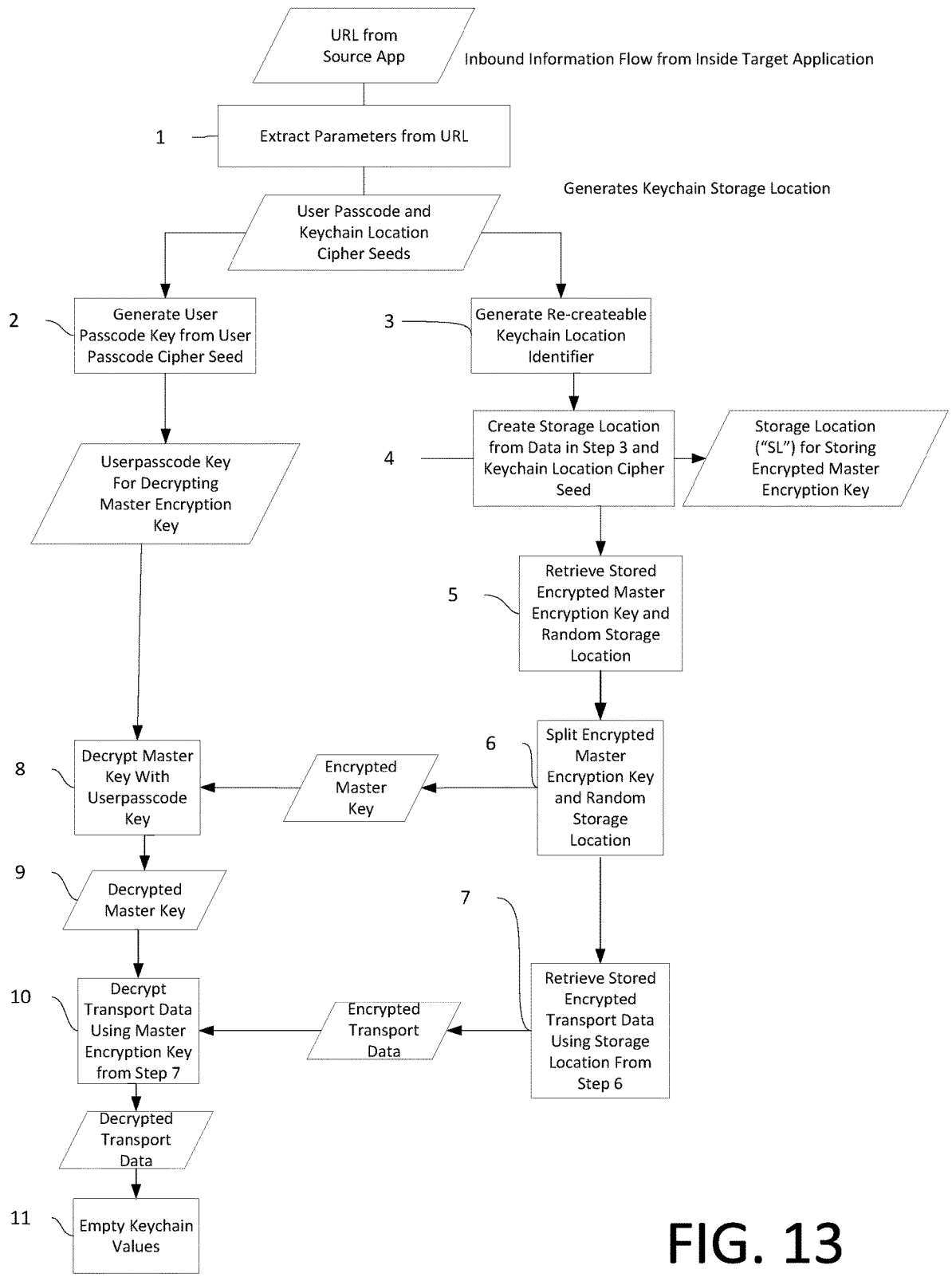
FIG. 13 is a flow chart illustrating an inbound single-sign-on authentication processing method in accordance with an embodiment of the invention.

FIG. 13 illustrates the process of a target app retrieving a user's authentication credentials in the Keychain according to an embodiment of the invention. As FIG. 13 shows, the process begins with receiving a URL from a source app containing the User Passcode Cipher Seed and Keychain Location Identifier. In FIG. 13, step 1, the app extracts the User Passcode Cipher Seed and Keychain Location Identifier from the URL.

In FIG. 13, step 2, the Encryptor generates a User Passcode Key from the User Passcode Cipher Seed extracted from step 1. This User Passcode Key matches the User Passcode Key generated in FIG. 11, step 4. This encryption key is for encrypting and decrypting a Master Encryption Key. In one embodiment of the invention, the User Passcode Key is a 256-bit key for decrypting a message in accordance with the AES encryption standard.

In FIG. 13, step 3, the Encryptor encrypts the Keychain Location Identifier extracted from the URL in step 1 by generating an Encrypted Keychain Location Identifier. This Encrypted Keychain Location Identifier matches the Encrypted Keychain Location Identifier generated in FIG. 11, step 5. In one embodiment of the invention, the Encryptor encrypts the Keychain Location Identifier by hashing the Keychain Location Identifier. The hashed Keychain Location Identifier may be generated using any hashing encryption technique known in the art. In one embodiment of the invention, the Encryptor hashes the Keychain Location Identifier into a 64 hexadecimal character message digest.

In FIG. 13, step 4, the Encryptor combines the 16 hexadecimal character Keychain Location Identifier and the 64 hexadecimal character hashed Keychain Location Identifier message digest into a Master Encryption Key Storage Location. This Storage Location matches the Master Encryption Key Storage Location generated in FIG. 3, step 6, and indicates the location where the Master Encryption Key and Transport Data Location will be stored.

In FIG. 13, step 5, the Keychain retrieves the information stored in the Master Encryption Key Storage Location. As FIG. 8 illustrates, the Encrypted Master Encryption Key and Transport Data Storage Location are both stored at this location.

In FIG. 13, step 6, the Transport Data Keychain Location is split from the Encrypted Master Encryption Key. The Transport Data Keychain Location specifies the location in the Keychain where the encrypted Transport Data is stored.

In FIG. 13, step 7, the Encryptor decrypts the Master Encryption Key using the User Passcode Key generated in step 2. The decrypted Master Encryption Key enables the Encryptor to decrypt the encrypted Transport Data.

In FIG. 13, step 8, the Keychain retrieves the Encrypted Transport Data at the location specified by the Transport Data Keychain Location.

In FIG. 13, step 9, the Encryptor decrypts the Transport Data using the Master Encryption Key from step 7.

As FIG. 13 illustrates, the target app may then extract the user's credentials. With the user's credentials, the target app may authenticate the user automatically, without requiring the user to reauthenticate the target app. The user need only authenticate a single time, from the source app, and the Keychain, Keychain Access Group Manager, Encryptor, and URL Loading System will automate the authentication of target apps in the ecosystem. Accordingly, the components and processes described above show how to provide single-sign-on functionality.

Figure 14:
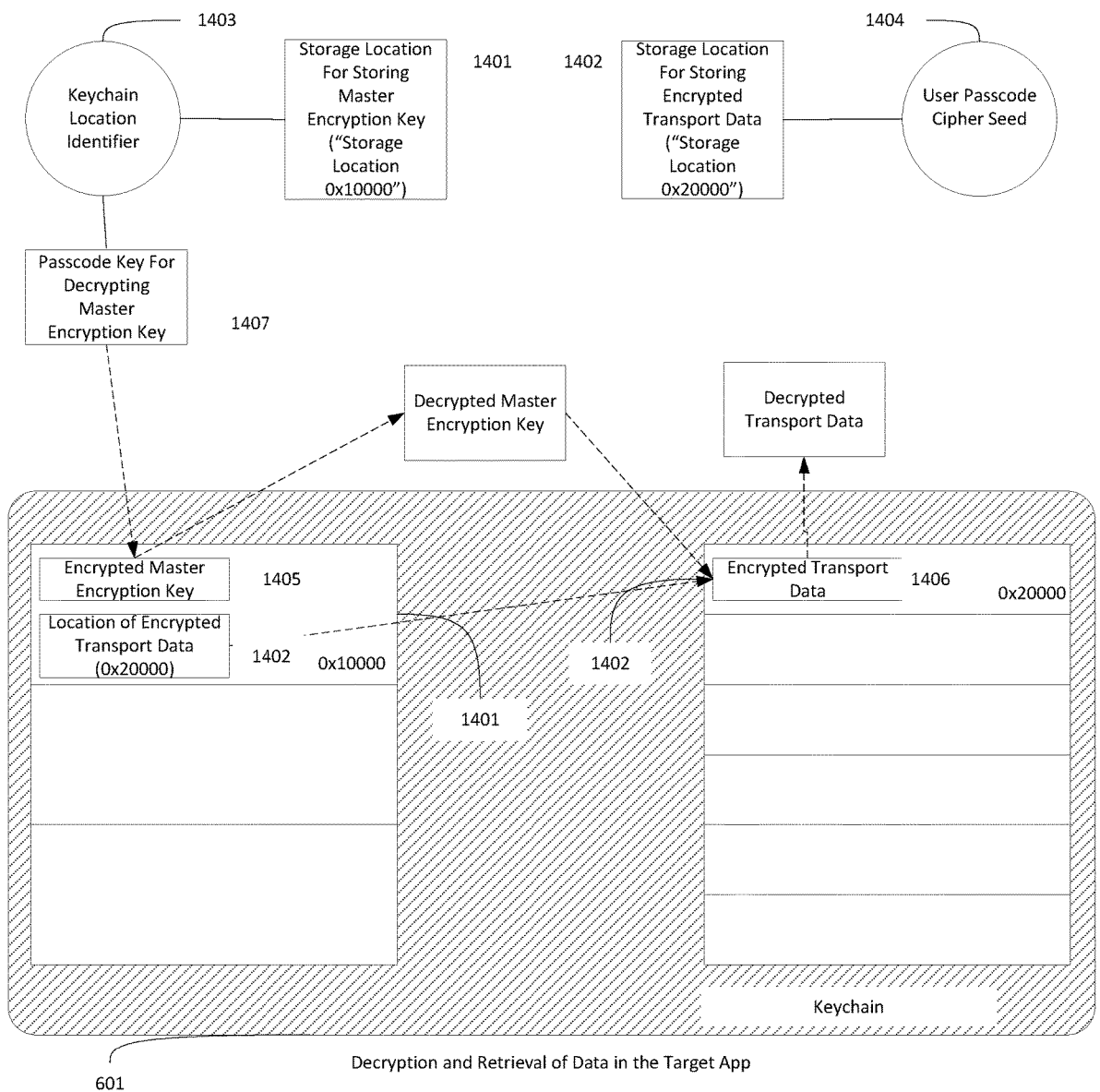
FIG. 14 is a block diagram illustrating the encryption and storage of information in a source app in accordance with an embodiment of the invention.

FIG. 14 is a block diagram illustrating how the Keychain Location Identifier and User Passcode Cipher Seed is used to decrypt and retrieve data in accordance with one embodiment of the invention. FIG. 14 depicts a Keychain 1400, a first location in Keychain memory 1401, a second location in Keychain memory 1402, a Keychain Location Identifier 1403, a User Passcode Cipher Seed 1404, an Encrypted Master Encryption Key 1405, and an Encrypted Transport Data 1406. The first location in Keychain memory 1401 is the location of the second location in Keychain memory 1402, and Encrypted Master Encryption Key 1405. The second location in Keychain memory 1402, is the location of the Encrypted Transport Data 1406. The Keychain Location Identifier 1403 is used to generate the first location in Keychain memory 1401, and Passcode Key 1407 for decrypting the Encrypted Master Encryption Key 1405 as discussed above. The User Passcode Cipher Seed 1404 is used to generate the second location in Keychain memory 1402 as discussed above.

Although FIGS. 10-14 illustrate how a source app may share user authentication credentials with a target app, it will be apparent to those of ordinary skill in the art that the system and method described above is not limited to authentication credentials, and may be used to share any type of information supported by the apps in the ecosystem. For example, the Keychain, Keychain Access Group Manager, Encryptor, and URL Loading System described above may be used to transfer parameters, information content, or documents between apps.

It will be apparent to those skilled in the art, that the system and method for sharing information described above and in FIGS. 10-14, illustrates how apps can share user credential information without ever having to transfer or communicate the user's credentials themselves. Instead, the apps communicate the location of the information. Another layer of security is provided by encrypting the information in storage. Again, the apps can communicate how to decrypt the information by communicating the location of the decryption key, without ever having to transfer or communicate the keys themselves.

In one embodiment of the invention, an ecosystem app manages the storage of information content. For example, the storage of the information content may be managed by a briefcase app. In one aspect of the invention, the briefcase app facilitates the sharing of information by managing the information content in a central repository. Storing the information in a single repository reduces the number of fragmented localized pockets of document storage. Instead of storing redundant information in a sandbox for each app, each app may access the central repository. Through the briefcase app, users may share information between apps within the ecosystem, apps external to the ecosystem, or users on an external network, such as an intranet or the internet. Users can share the information with each other by transferring information to other users through the internet or intranet. In another aspect of the invention, the briefcase app may be operable without any connection to an external network.

In another aspect of the invention, the briefcase app maintains the security of the information content stored in the central repository. In one embodiment of the invention, the information is stored as encrypted data. The information may be stored and transferred between apps in an encrypted state. In another embodiment, access to local storage may be controlled by single-sign-on authentication. The single-sign-on access to the local storage may be controlled in accordance with the offline single-sign-on functionality described above. In another aspect of the invention, the briefcase app provides for data-wipe mechanisms that allow users to wipe information from the central repository.

In another aspect of the invention, the briefcase app manages the storage of the information to facilitate the location and retrieval of documents on the mobile device. Documents may be stored with metadata such as tags, which can later be searched, filtered, sorted, or indexed by the system.

In another aspect of the invention, the briefcase app provides a launch point for operations common among ecosystem apps. For example, the briefcase app may allow users to view or print information content in another app.

The app ecosystem improves app branding consistency by enabling each app to use a common library of user interface tools. The user interface tools may include common graphics tools, color palettes, button iconography, menu styles, animations, and transitions. By using the same graphics, color palettes, button iconography, menu styles, animations, and transitions for the different apps within the ecosystem, users will associate the apps with the same source, rather than from separate sources, improving brand consistency.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Mobile computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or iOS operating systems, Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system of platform. In other embodiments, the operating system may be or include operating systems specifically adapted for mobile devices, such as the Google Android™ mobile operating system, the Mozilla Firefox™ OS mobile operating system, the RIM BlackBerry™ mobile operating system, the Apple iOS™ mobile operating system, Nokia Symbian™ or S40™ (Series 40) mobile operating systems, Microsoft's Windows Phone™, Windows 8™, or Windows RT™ operating system, the Samsung bada™ mobile operating system, the Hewlett Packard webOS™ mobile operating system, the Palm OS™ mobile operating system, the Maemo™ mobile operating system, or the MeeGo™ mobile operating system.

At a minimum, the memory includes at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer 100 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, Objective C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, capacitive and resistive (multi-touch) touch screens, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations.

The invention claimed is:

1. A method for securely transferring data between at least two software applications within a restricted ecosystem of software applications, the method comprising:
    loading a first of said at least two software applications onto an application loader;
    encrypting transport data to transfer from said first of said at least two software applications to a second of said at least two software applications, said transport data being encrypted with a master key;
    storing said encrypted transport data at a first location in a computer memory;
    storing, at a second location in said computer memory, said master key and a first address of said first location, a second address of said second location being generated from a keychain location cipher seed; and
    communicating said keychain location cipher seed to said second of said at least two software applications.

2. The method of claim 1, further comprising communicating said user passcode cipher seed to said second of said at least two software applications.

3. The method of claim 1, wherein said transport data comprises security information for authenticating said first of said at least two software applications.

4. The method of claim 1, wherein said transport data comprises security information for authenticating a user of one of said at least two software applications.

5. The method of claim 1, wherein said at least two software applications are executing on a single computing device.

6. The method of claim 1, wherein said at least two software applications are executing on different computing devices.

7. The method of claim 1, wherein said at least two software applications are associated with a single user.

8. The method of claim 1, wherein said at least two software applications are associated with different users.

9. A mobile communications system for transferring data between at least two software applications within a restricted ecosystem of software applications, the system comprising:
    at least one computer memory storing instructions; and
    at least one computer processor programmed for providing at least one application loader and at least one ecosystem controller;
    said at least one application loader for loading said at least two software applications onto said at least one computer processor for execution;
    said at least one ecosystem controller programmed to:
        load a first of said at least two software applications onto said at least one application loader,
        encrypt transport data to transfer from a first of said at least two software applications to a second of said at least two software applications, said transport data being encrypted with a master key;
        store said encrypted transport data at a first location in said computer memory;
        store, at a second location in said computer memory, said master key and a first address of said first location, a second address of said second location being generated from a keychain location cipher seed; and
        communicate said keychain location cipher seed to said second of said at least two software applications.

10. The system of claim 9, said at least one ecosystem controller being further programmed to communicate said user passcode cipher seed to said second of said at least two software applications.

11. The system of claim 9, wherein said transport data comprises security information for authenticating said first of said at least two software applications.

12. The system of claim 9, wherein said transport data comprises security information for authenticating a user of one of said at least two software applications.

13. The system of claim 9, wherein said at least two software applications are executing on a single computing device.

14. The system of claim 9, wherein said at least two software applications are executing on different computing devices.

15. The system of claim 9, wherein said at least two software applications are associated with a single user.

16. The system of claim 9, wherein said at least two software applications are associated with different users.

17. The system of claim 9, said at least one ecosystem controller being further programmed to:
    receive said keychain location cipher seed for said second of said at least two software applications;
    generate said second address of said second location based on said received keychain location cipher seed;
    retrieve, from said second location, said master key and said first address of said first location; and
    decrypt, with said master key, said encrypted transport data retrieved from said first location.

18. A method for securely transferring data between at least two software applications within a restricted ecosystem of software applications, the method comprising:
    loading a first of said at least two software applications onto an application loader;
    receiving, from a second of said at least two software applications, a keychain location cipher seed;
    generating a first address of a first location based on said received keychain location cipher seed, said first location being part of at least one computer memory;
    retrieving, from said first location, a master key and a second address of a second location, said second location being part of said at least one computer memory;
    retrieving, from said second location, encrypted transport data; and
    decrypting said encrypted transport data with said retrieved master key.

19. The method of claim 18, wherein said at least two software applications are associated with a single user.

20. The method of claim 18, wherein said at least two software applications are associated with different users.

* * * * *